US011989991B2

(12) United States Patent
Agapov et al.

(10) Patent No.: US 11,989,991 B2
(45) Date of Patent: May 21, 2024

(54) SYSTEM AND METHOD FOR EXPEDITING THE DELIVERY OF FOOD ORDERS TO CUSTOMERS

(71) Applicant: GFC Automat Inc., Brick Township, NJ (US)

(72) Inventors: Alexander Agapov, Los Angeles, CA (US); Steven R. Baker, Winter Garden, FL (US); Robert A. Baydale, Windemere, FL (US); Shawn C. Inman, New York, NY (US); Christopher M. Mele, New York, NY (US); Norman L. Norris, Bonita Springs, FL (US); Joseph F. Scutellaro, Brick Township, NJ (US); Stephen M. Scutellaro, Atlantic Highlands, NJ (US); Craig C. Stickler, Orlando, FL (US); Richard L. Watts, New York, NY (US)

(73) Assignee: GFC Automat Inc., Brick Township, NJ (US)

( * ) Notice: Subject to any disclaimer, the term of this patent is extended or adjusted under 35 U.S.C. 154(b) by 0 days.

(21) Appl. No.: 18/057,043

(22) Filed: Nov. 18, 2022

(65) Prior Publication Data

US 2023/0081289 A1 Mar. 16, 2023

Related U.S. Application Data

(62) Division of application No. 17/308,844, filed on May 5, 2021, now Pat. No. 11,514,742.

(Continued)

(51) Int. Cl.
*G07C 9/33* (2020.01)
*G07C 9/00* (2020.01)
*H04W 4/14* (2009.01)

(52) U.S. Cl.
CPC .......... *G07C 9/33* (2020.01); *G07C 9/00309* (2013.01); *G07C 9/00912* (2013.01); *H04W 4/14* (2013.01)

(58) Field of Classification Search
None
See application file for complete search history.

(56) References Cited

U.S. PATENT DOCUMENTS 1,512,674 A * 10/1924 Campbell ............ A47J 37/0611
99/332
6,477,578 B1 * 11/2002 Mhoon .................. G06Q 40/03
709/227

(Continued)

FOREIGN PATENT DOCUMENTS

| GB | 2549127 A | 10/2017 |
|---|---|---|
| WO | 2019014027 A1 | 1/2019 |
| WO | 2019132766 A1 | 7/2019 |

OTHER PUBLICATIONS

Albrecht, Chris, "Minnow Launches its Lunch Delivery Pods in Portland, OR", The Spoon, Mar. 2, 2020, 4 pages. https://thespoon.tech/minnow-launches-its-lunch-delivery-pods-in-portland-or/.

(Continued)

*Primary Examiner* — Carlos Garcia
(74) *Attorney, Agent, or Firm* — Steven J. Rocci P.C.

(57) ABSTRACT

Automated food delivery methods and systems using computer-managed delivery to an array of food delivery enclosures and computer-enabled customer access to the food delivered to the enclosures. Customers using the methods and systems may utilize their personal communication device such as a cell phone or tablet to order food and subsequently open an enclosure containing their food order.

21 Claims, 24 Drawing Sheets

Related U.S. Application Data

(60) Provisional application No. 63/205,483, filed on Dec. 15, 2020, provisional application No. 63/101,627, filed on May 7, 2020.

(56) References Cited

U.S. PATENT DOCUMENTS

| | | | | |
|---|---|---|---|---|
| 7,568,618 | B1* | 8/2009 | Scutellaro | G06Q 50/12 |
| | | | | 235/383 |
| 8,261,980 | B1* | 9/2012 | Scutellaro | G06Q 30/04 |
| | | | | 235/383 |
| 8,639,626 | B2* | 1/2014 | Bible, Jr. | G06Q 20/401 |
| | | | | 705/50 |
| 10,482,525 | B2* | 11/2019 | Mueller | G07G 1/14 |
| 10,885,492 | B2* | 1/2021 | Goldberg | G06Q 10/087 |
| 10,902,371 | B2* | 1/2021 | Goldberg | G06Q 10/087 |
| 11,393,006 | B2* | 7/2022 | Salonen | H04W 12/06 |
| 2002/0130065 | A1* | 9/2002 | Bloom | B07C 3/00 |
| | | | | 209/630 |
| 2012/0290390 | A1* | 11/2012 | Harman | G06Q 20/3224 |
| | | | | 705/26.1 |
| 2014/0002236 | A1 | 1/2014 | Pineau et al. | |
| 2014/0279276 | A1* | 9/2014 | Tolcher | G06Q 20/12 |
| | | | | 705/26.81 |
| 2015/0142906 | A1* | 5/2015 | Tolcher | H04L 51/18 |
| | | | | 709/206 |
| 2015/0186840 | A1* | 7/2015 | Torres | A47F 10/02 |
| | | | | 705/339 |
| 2017/0024944 | A1* | 1/2017 | Savage | G07C 9/00912 |
| 2017/0213259 | A1* | 7/2017 | Gruber | G06Q 30/0282 |
| 2017/0330144 | A1* | 11/2017 | Wakim | H04W 4/023 |
| 2018/0262891 | A1 | 9/2018 | Wu et al. | |
| 2019/0051087 | A1* | 2/2019 | Goldberg | G05D 1/0088 |
| 2021/0059454 | A1* | 3/2021 | Luke | A47G 29/1214 |
| 2021/0368304 | A1* | 11/2021 | Marwah | G06F 9/5005 |

OTHER PUBLICATIONS

"Minnow Provides Residential Buildings and Workplaces a Safer, No-Contact Food Delivery Solution in Response to Covid-19", Minnow Press Release, Mar. 19, 2020, 2 pages, https://f.hubspotusercontent00.net/hubfs/7508309/Minnow/Technologies_November2020/docs/Minnowpod-Press-Release.pdf.

Wolfe, Anna, "Minnow Launches Piloy Program for its Contact-Free Food Pickup Pods", Hospitality Technology, Oct. 14, 2020, 2 pages, https://hospitalitytech.com/minnow-launches-pilot-program-its-contact-free-food-pickup-pods.

\* cited by examiner

Computer ordering by using a portable personal device

| | Step 1 | Step 2 | Step 3 | Step 4 | Step 5 | Step 6 | Step 7 |
|---|---|---|---|---|---|---|---|
| Channel/Party Accessed | WEB/ Restaurant | Web/POS Provider | Web/POS Provider | EMAIL/POS Provider | SMS/ Restaurant | SMS/ Restaurant | SMS |
| Action | Access Restaurant Website | Create Order | Place Order/ Pay | Order Confirmation EMAIL* | Advise Order in Progress** | Advise Order Almost Ready | Advise About Pickup |
| Details | See Restaurant Information Including Menu and Order Button | Review Menu and Select Menu Items | Payment, Pick-up Time, Contact EMAIL Contact Phone | | | | Provide Pickup Code/ URL for Touchless Pickup |

*Customer receives EMAIL if restaurant is unable to fulfill order or POS provider is unable to verify
**Customer receives EMAIL if, after advising customer that order is in progress, there is an issue or the order is not collected from the allocated enclosure

FIG. 14

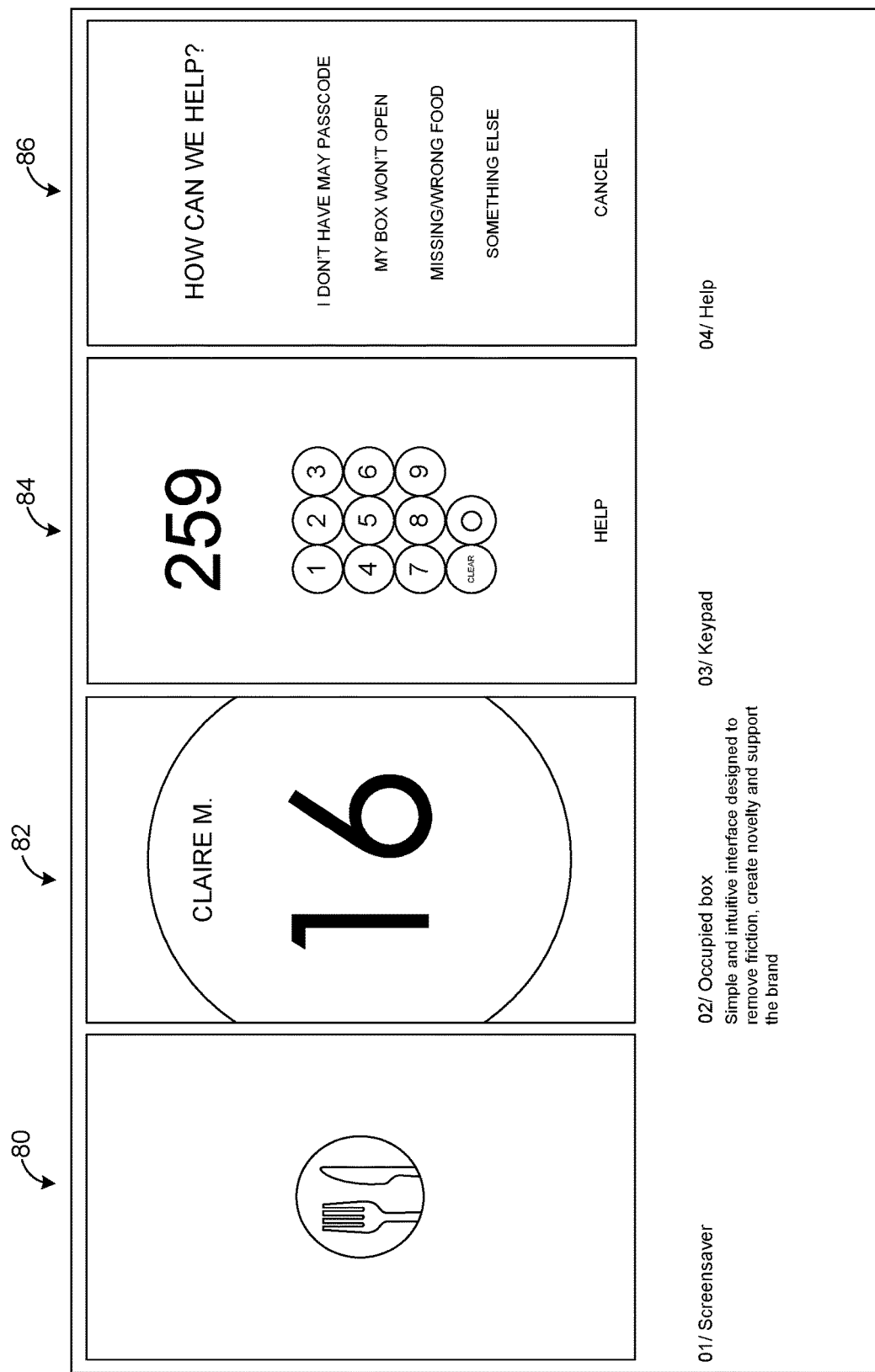

Computer ordering by using an onsite kiosk

| | Step 1 | Step 2 | Step 3 | Step 4 |
|---|---|---|---|---|
| Channel/Party Accessed | | POS Provider | POS Provider | Restaurant |
| Action | Screensaver | Create Order | Place Order/Pay | Receive pickup code |
| Details | | Review Menu and select Menu items | Payment, pickup time contact phone, Optional Printed receipt with pickup code | Displayed at Kiosk and delivered to contact phone via SMS |

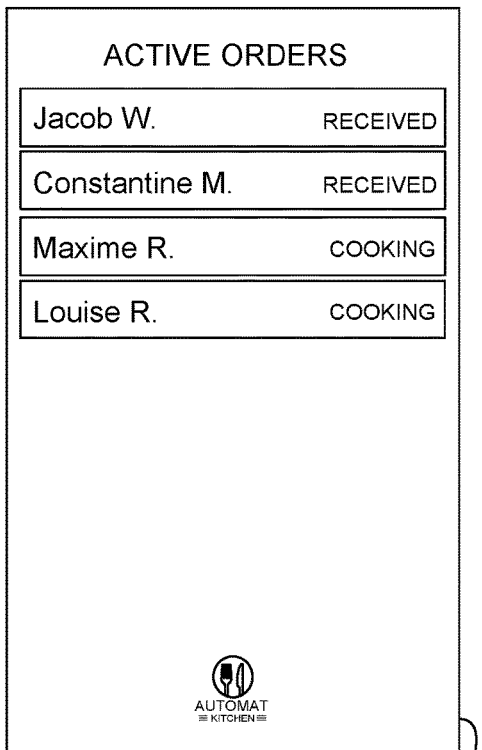
FIG. 19
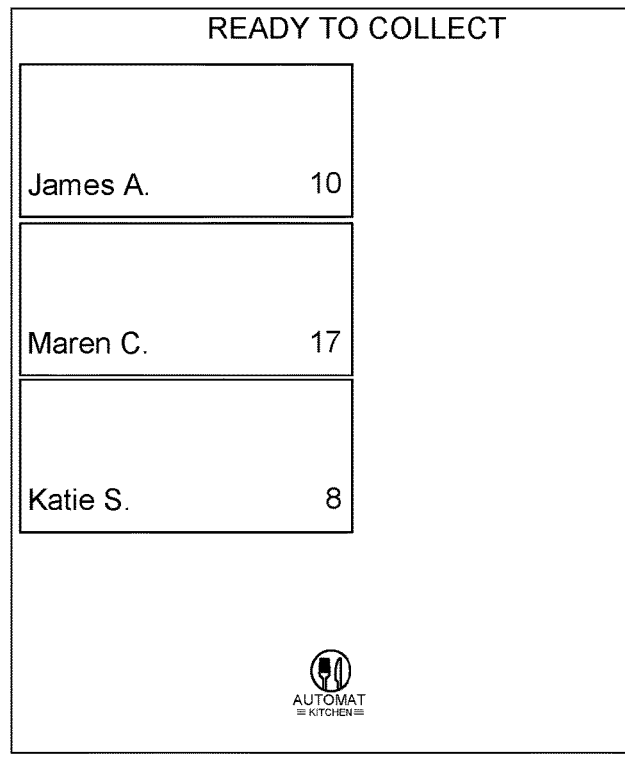
FIG. 20
| READY TO COLLECT | | | |
|---|---|---|---|
| James A. | 10 | Jacob W. | 4 |
| Maren C. | 17 | Consantine M. | 12 |
| Kaylynn C. | 16 | Lindsey K. | 1 |
| Kadin S. | 8 | Terry T. | 15 |
| Ahmad S. | 11 | Marilyn A. | 19 |
| Roger S. | 14 | Skylar Z. | 20 |
| Carter L. | 13 | Martine P. | 2 |
| Kianna H. | 5 | Zain P. | 6 |
| Roger G. | 18 | Emery A. | 9 |
| Carla D. | 7 | Ann M. | 3 |
FIG. 21

SYSTEM AND METHOD FOR EXPEDITING THE DELIVERY OF FOOD ORDERS TO CUSTOMERS

CROSS REFERENCE OF RELATED APPLICATIONS

This application is a division of, and claims priority to, U.S. patent application Ser. No. 17/308,844, filed May 5, 2021, now U.S. Pat. No. 11,514,742, which claims the benefit under 35 U.S.C. 119 (e) of U.S. Provisional Application No. 63/101,627, filed May 7, 2020, and U.S. Provisional Application No. 63/205,483 filed Dec. 15, 2020. The entire contents of all of the foregoing are incorporated herein as if fully set forth herein.

FIELD OF INVENTION

This invention relates generally to the delivery of food orders to customers using an array of enclosures in which food orders are placed by a supplier and from which food orders are retrieved by customers.

TRADEMARK AND COPYRIGHT RESERVATION

A portion of the disclosure contains material which is subject to trademark and copyright protection. The trademark and copyright owner(s) has (have) no objection to reproduction of the disclosure in the form in which it appears in the files of the US Patent & Trademark Office, but otherwise all rights are reserved. Copyright ©2019 Automat Kitchen, LLC.

BACKGROUND OF THE INVENTION

U.S. Pat. Nos. 7,568,618 and 8,261,980, which are incorporated herein by reference, describe a system and method for delivering food to customers using an array of enclosures. Each of the enclosures includes a food supply opening through which food is placed in the enclosure and a food delivery opening through which food is delivered to the customer after a door which covers the delivery opening is unlocked and opened by the customer. A similar system and method are described in U.S. patent application Ser. No. 15/247,511 filed Aug. 25, 2016, now U.S. Pat. No. 10,482,525.

SUMMARY OF INVENTION

The patent claims summarize many of the important aspects of the invention, and these and other important aspects are described in the following specification as well as the drawings.

BRIEF DESCRIPTION OF THE DRAWINGS

The detailed description of the preferred embodiments and various important aspects of the invention will be better understood with reference to the following drawings:

FIG. 14 is a chart depicting an algorithm for and the various steps in a method by which a customer orders food to be delivered to an enclosure by using a computer, tablet, smart phone or other portable personal device.

FIG. 15A illustrates four sequentially presented images on the screen of an enclosure receiving a food order which the customer can retrieve using their portable personal device without touching the enclosure surfaces.

FIG. 16 is a chart depicting an algorithm for and the various steps in a method by which a customer orders food to be delivered to an enclosure by using a kiosk in the restaurant.

FIG. 18C illustrates the display of FIG. 18A at a slightly later point in time than that illustrated in FIG. 18B showing 1 of the 6 orders in the queue being loaded in 2 of the 20 available boxes.

FIG. 18D illustrates the display of FIG. 18A at a point in time when there are 4 orders in the queue, 5 enclosures holding orders and 1 enclosure disabled.

FIG. 18E illustrates the display of FIG. 18A at a later point in time after 1 order has been loaded into 2 adjacent boxes leaving 18 available enclosures for the 1 order in the queue.

FIG. 18F illustrates the display of FIG. 18A with 6 orders in the queue and 9 enclosures available with 11 enclosures unavailable for various reasons.

FIG. 19 illustrates a display on a monitor advising customers of the status of orders received but not yet in the order queue.

FIG. 20 illustrates a display on a monitor advising customers of orders which have been prepared and placed in enclosures.

FIG. 21 illustrates the display on the monitor shown in FIG. 20 advising customers of orders using all 20 enclosures.

DESCRIPTION OF PREFERRED EMBODIMENTS

Figure 1:
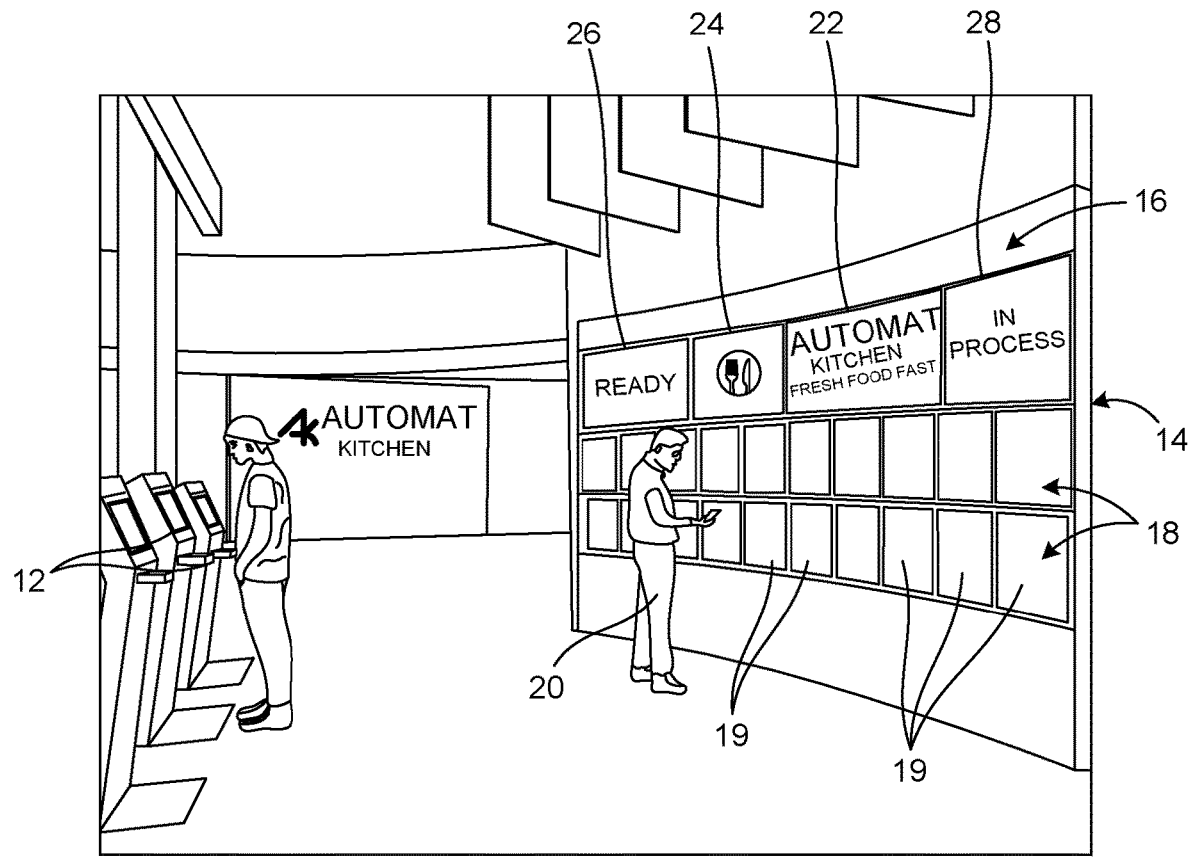
FIG. 1 illustrates a food ordering and delivery system employing an array of food enclosures to deliver food to customers and FIG. 1A illustrates a kiosk for ordering food.
Figure 6:
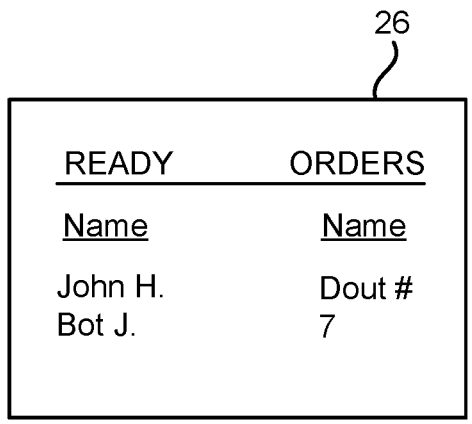
FIG. 6 is a view of a screen at the top of the array shown in FIG. 1 for displaying customer orders which are ready for delivery.
Figure 7:
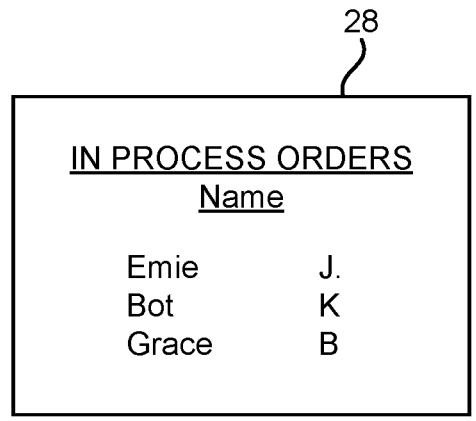
FIG. 7 is a view of a screen at the top of the array shown in FIG. 1 for displaying customer orders which are in the process of being prepared.

In FIG. 1, a food ordering and delivery system embodying the invention disclosed including food ordering kiosks 12 and a wall 14 incorporating an array 16 of food enclosures or boxes 18. Each of the enclosures 18 includes a touch screen door 19 which will automatically open as will be described in greater detail with respect FIGS. 4A-D so as to permit food to be delivered to a customer 20 standing in front of the array 16. The wall 14 includes promotional/informational screens 22 and 24 located at the top of the wall 14 above the enclosures 18. In addition, the wall 14 includes a customer order "READY" monitor 26 for displaying a customer name and enclosure number from which a food order can be delivered to the customer as will be described in greater detail with reference to FIG. 6. The wall 14 also includes a customer order status or "IN PROCESS" screen 28 for displaying the status of a customer order as will be described in further detail with reference to FIG. 7. The kiosks 12 include a touch screen 30 as shown in FIG. 1A for ordering specific items which appear on the touch screen 30 as well as a slot 32 for receiving a credit or debit card for charging the cost of the food order as also shown in FIG. 1A.

Figure 1A:
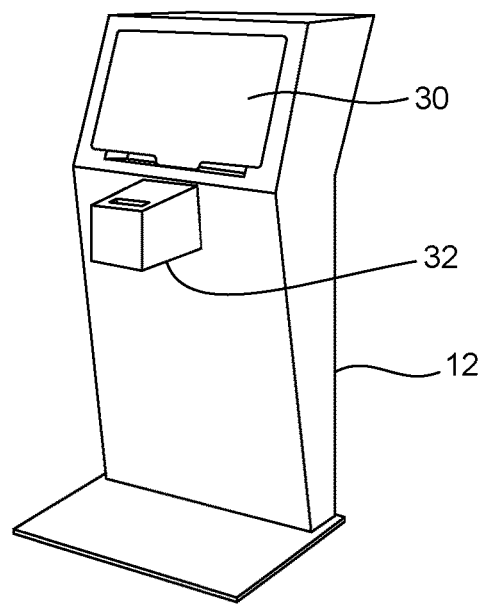
Figure 2:
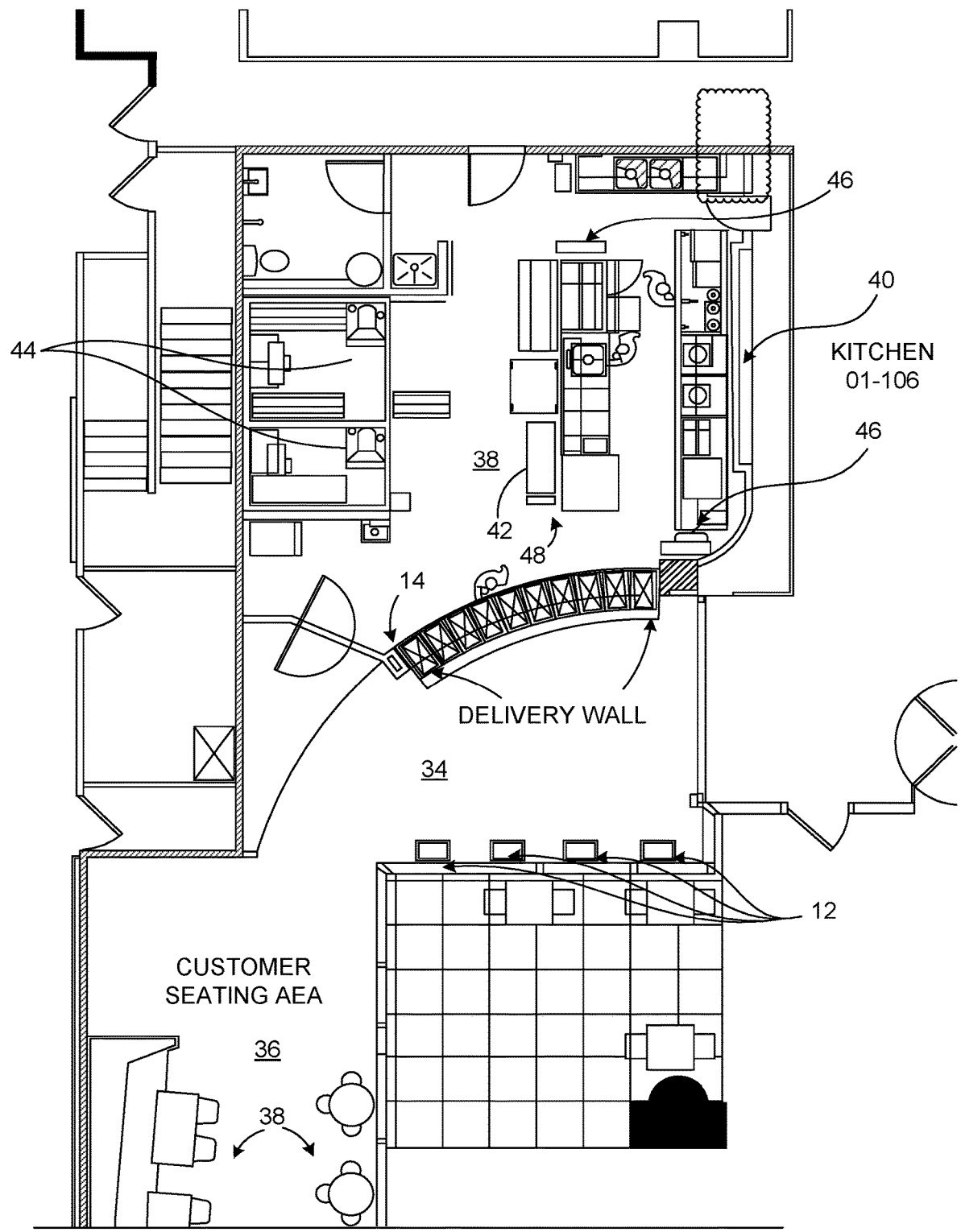
FIG. 2 is a plan view of a restaurant employing the food ordering and delivery system illustrated in FIG. 1 and a plurality of the kiosks illustrated in FIG. 1A.

The food ordering and delivery system shown FIGS. 1 and 1A is incorporated into a food service facility such as a restaurant as shown in FIG. 2 wherein the wall 14 separates a customer accessible area 34 including a seating area 36 with tables and chairs 38 as well as the kiosks 12 and a food preparation and supply area 38 which includes kitchen equipment 40, counters 42 and storage areas 44. In accordance with one important aspect of the preferred embodiments, the food preparation area 38 includes one or more preparation monitors 46 visually and physically accessible to kitchen personnel who prepare food orders. These monitors 46 display all customer orders as will be described in greater detail with reference to FIG. 9. In further accordance with this important aspect, the food preparation area 38 also includes at least one kitchen expediter or control monitor 48 visually and physically accessible to kitchen order expediters directing and supplying prepared orders to available enclosures in the array 16 as will be described in greater detail with reference to FIG. 10.

Figure 3:
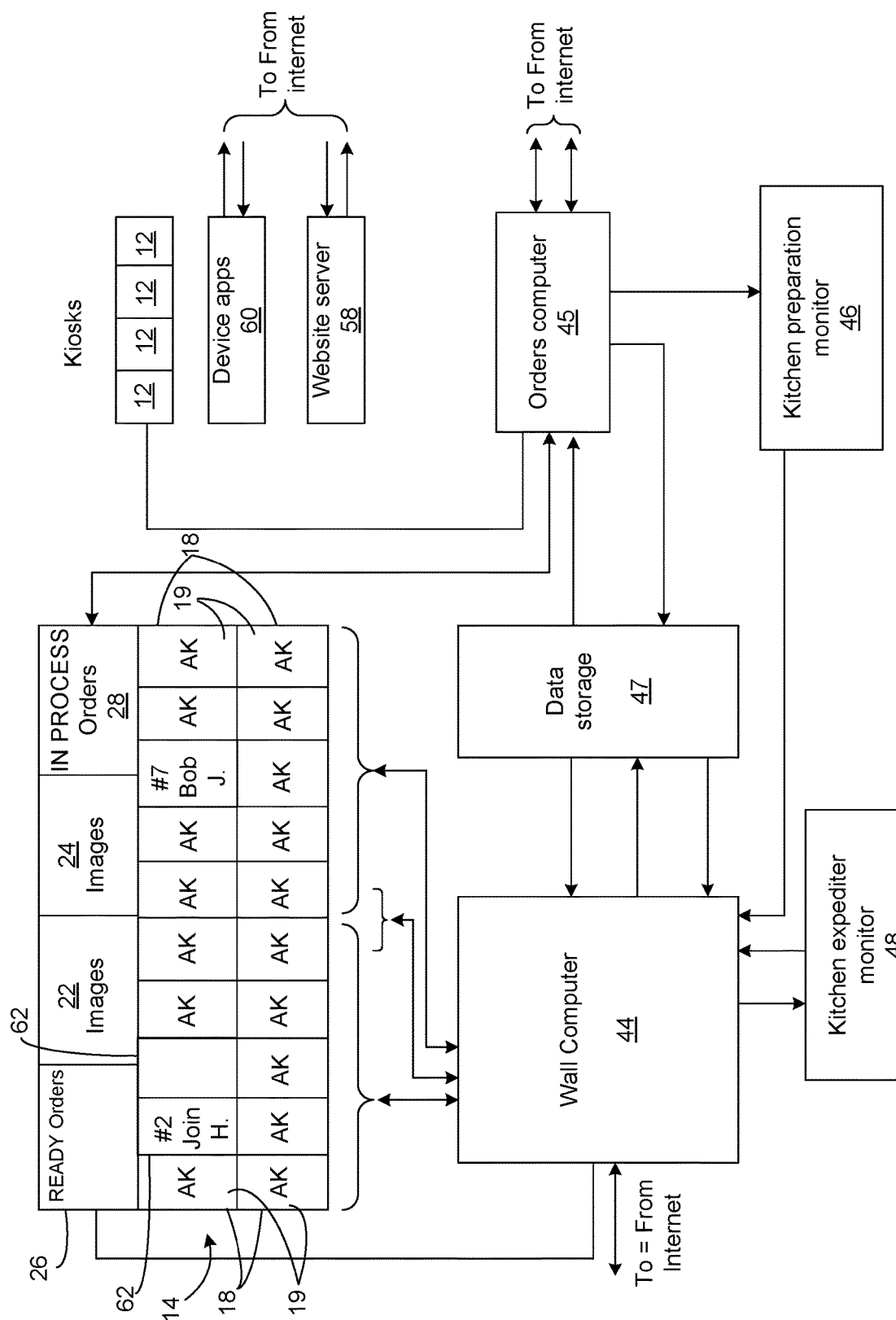
FIG. 3 is a schematic representation of the food ordering and delivery system illustrated in FIGS. 1, 1A and 2.

As shown in FIG. 3, the wall 14 and the kiosks 12 are under the control of a computer system comprising digital processing hardware and a digital memory for storing software including programmed instructions. The digital processing hardware includes a master computer or "Wall Computer" 44 and an ordering and billing computer or "Order Computer" 45, and the digital memory includes a data storage unit 47 in hardwired (as shown) or wireless communication with the master computer 44 and the ordering and billing computer 45. The ordering and billing computer 45 which may be on-site as shown or off-site is hardwired or in wireless communication with a server (not shown) hosting a website of the restaurant and/or a restaurant APP which customers may access using various portable, personal devices such as cell phones, tablets and lap tops. The ordering and billing computer 45 is also in communication with the personal devices of customers who are on-line with the restaurant website or the downloaded restaurant APP which facilitates the ordering of food. The point of sale (POS) functions provided by the ordering and billing computer 46 are commercially available using APIs such as those provided by Toast, Inc. and Panasonic. After a customer has entered and paid for his or her order at a kiosk or on a personal device using the restaurant APP or website, the customer will receive a customer specific code, preferably an at least three-digit numerical code, which will allow them to open one or more food enclosures 18 as will be described below.

FIG. 3 also depicts the various screens on the wall 12 including touch screens incorporated into each of food delivery doors 19 on the enclosures 18 which are coupled to and under the direct control of the master computer 44 or indirect control of the master computer if an individual microprocessor is provided for each touch screen doors 19. The customer order alert or READY ORDER screen 26 as well as the customer order status or IN PROCESS screen 28 are also coupled to and under the direct or indirect control of the master computer 44 depending on whether or not individual microprocessors are provided for these screens. In the same manner, the promotional/informational screens 22 and 24 are coupled to and directly or indirectly controlled by the master computer 44.

Figure 5A:
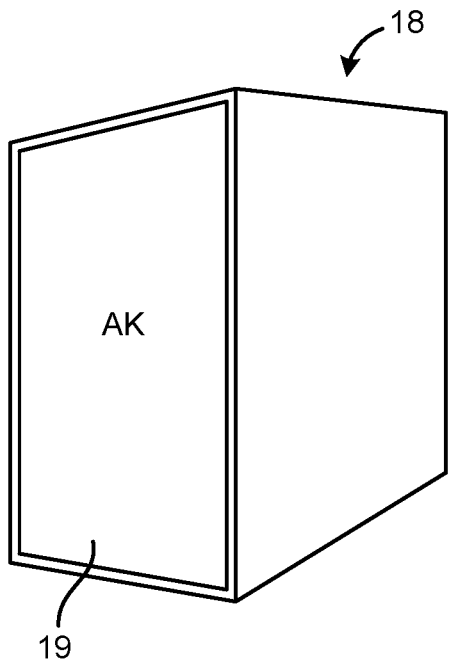
FIG. 5A is a frontal perspective view of the enclosure of FIG. 4A in the closed position displaying a promotional image on a screen.
Figure 5B:
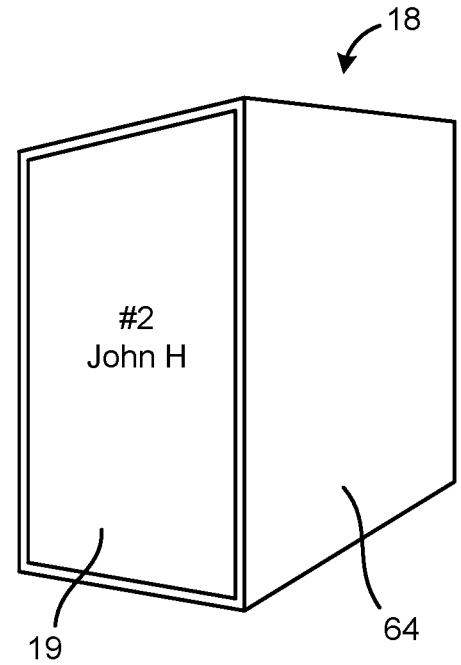
FIG. 5B is a frontal perspective view of the enclosure of FIG. 4A displaying an enclosure number and a customer name.

FIG. 3 also depicts the nature of the displays on the various touch screens in the doors 19 of the enclosures 18. When an enclosure does not contain a food order, a promotional and/or decorative display such as that shown in FIG. 5A will appear on the touch screen door of the enclosure. As shown in FIG. 5A, the display is static but it may also be dynamic; i.e., a video. When an enclosure does contain a food order, the number of the enclosure 18 and name of the customer appears on the touch screen door 19 as also shown in FIG. 5B. In accordance with one important aspect, an order may require and therefore be placed in a plurality of adjacent enclosures. Under these circumstances, peripheral portions 62 of the screens on two adjacent enclosures are highlighted as shown in FIG. 3 and FIGS. 8 (A-D).

Figure 3A:
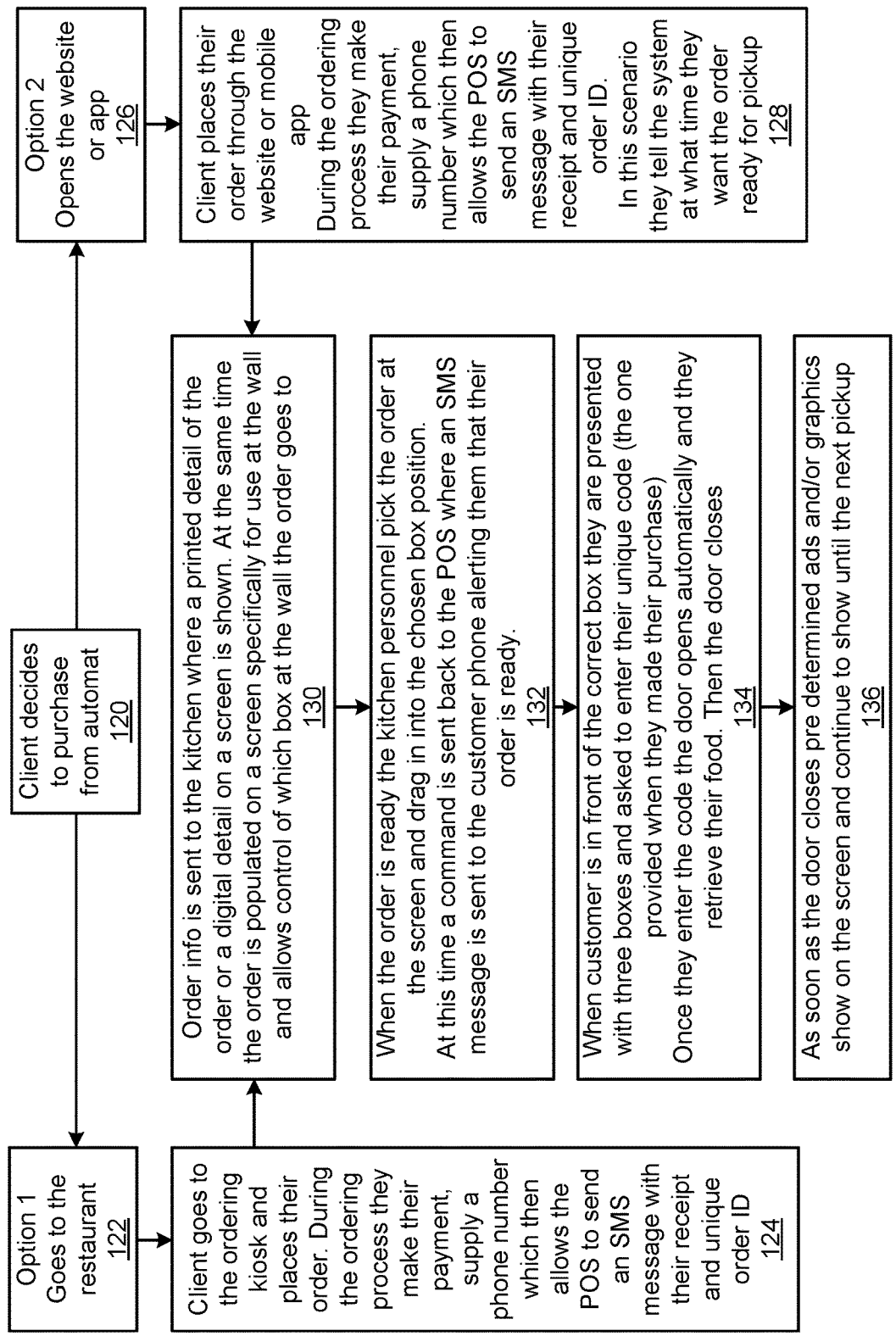
FIG. 3A is a flow chart for the system shown in FIG. 3.

The flow chart of FIG. 3A describes the various steps of customer ordering process and the delivery of food orders using the system of FIG. 3. The customer initially decides in Step 120 whether to go to the restaurant or other food service facility to order (Step 122) or to use a web site or App of the restaurant or food service facility for ordering (Step 120). If the customer goes to the restaurant or food service facility to order, the customer will order at one of the kiosks 12 and use the kiosk touch screen 30 to provide the necessary order information (Step 124). If the customer uses the web site or App to order, the order is remotely entered (Step 126). Once the order is entered regardless of the location of entry, the order is transmitted to the food preparation area 38 under the control of the order and billing computer 45 for preparation and deliver to a box 18 (Step 130). When the order is ready, a kitchen expediter assigns a box(es) 18 for receiving the delivery to the customer and the customer is notified that their order is ready by sending a message to the customer's personal device (Step 132). The customer's food order is then placed in a box 18 where the customer may collect it after entering an assigned code whereupon the door 19 of the box 18 opens (Step 134). After the customer collects the food order, the door 19 of the box 18 automatically closes (Step 136).

Figure 4A:
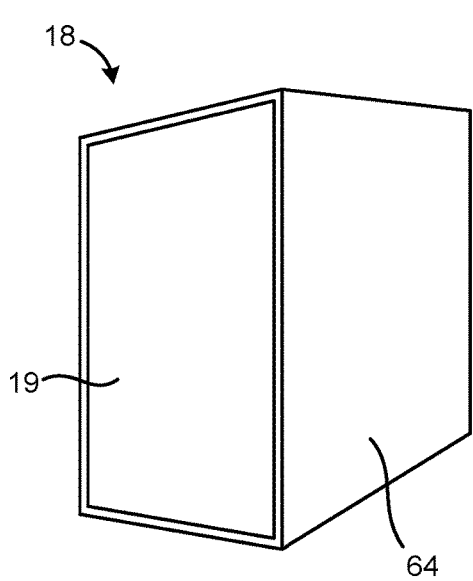
FIG. 4A is a frontal perspective view of one of the enclosures in the array shown in FIG. 1 in a closed condition.
Figure 4B:
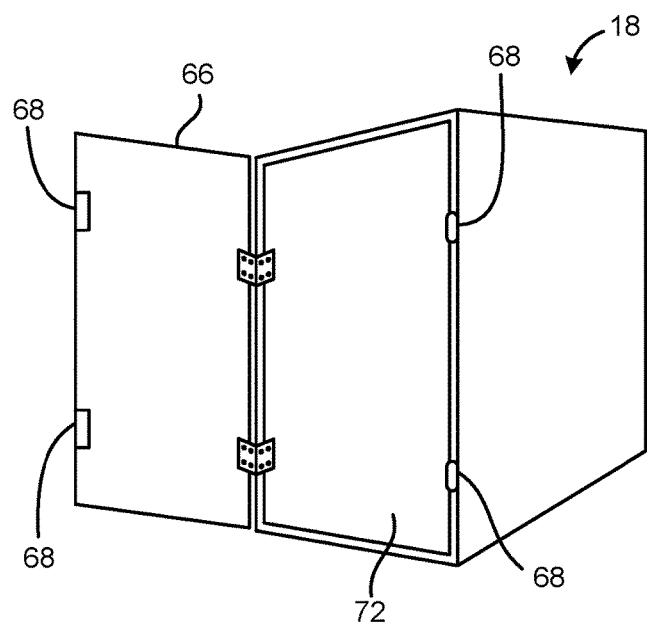
FIG. 4B is a rear perspective view of the enclosure shown in FIG. 4A shown from the back of the enclosure which has been opened in the rear to permit food to be supplied to the enclosure.
Figure 4C:
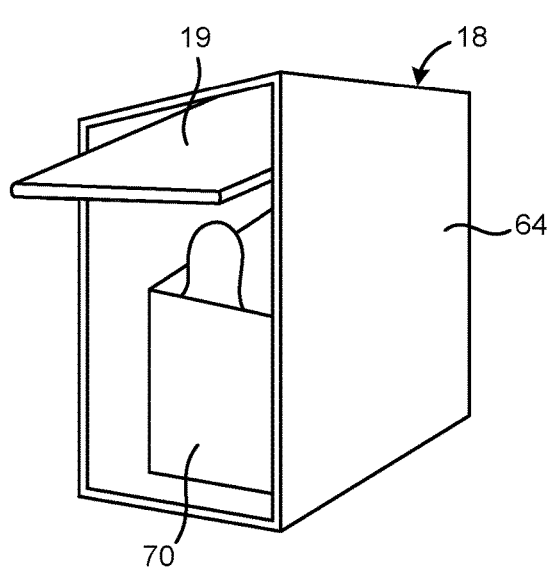
FIG. 4C is a frontal perspective view of the enclosure of FIG. 4A in a partially open position.
Figure 4D:
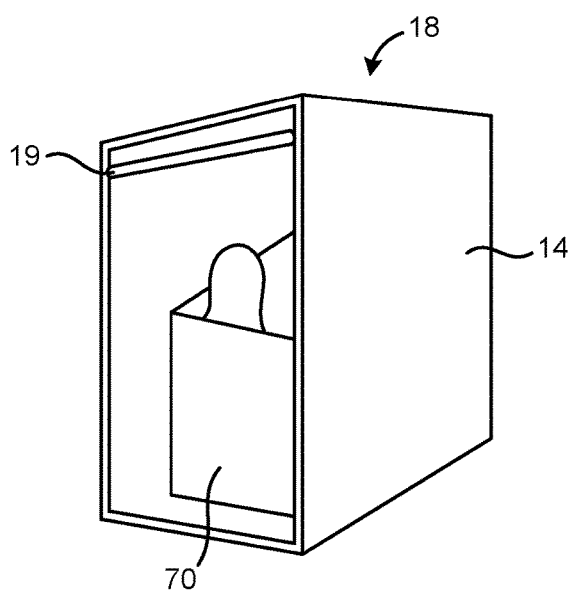
FIG. 4D is a frontal perspective view of the enclosure of FIG. 4A which is fully open in the front to permit food to be delivered or retrieved from the enclosure to or by a customer.
Figure 8A:
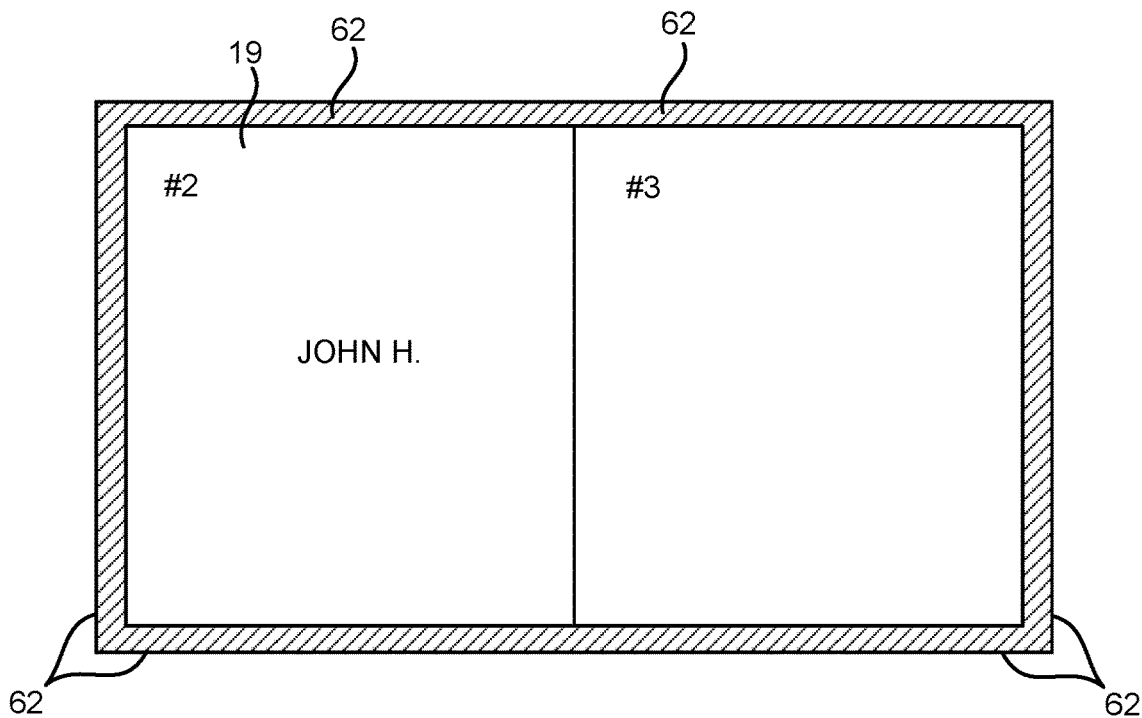
FIG. 8A is a view of screens on two adjacent enclosures in the array shown in FIG. 1 including the screen shown in FIG. 5B.

In FIG. 4A, a single enclosure 18 of the wall 14 is shown in the closed condition with the touch screen door 19 closing the food delivery opening at the front of the enclosure 18; i.e., on the side facing the customer accessible area 34 as shown in FIG. 2. The touch screen door 19 and sides 64 form the enclosure along with a hinged door 66 on the food preparation side 38 which is shown in the open position in FIG. 4B but can be closed and maintained in the closed position by magnetic catches 68. When the hinged door 66 is in the open position as shown FIG. 4B, a food order may be supplied through an opening 72 before being closed prior to initiating the opening of the touch screen door 19 as shown in FIG. 4C and before the touch screen door 19 is fully raised up and retracted like a garage door into the enclosure 18 as shown in FIG. 4D by a motor driven retraction mechanism. When the touch screen door 19 is in the closed position before a food order 70 has been delivered to the enclosure through a food supply opening 72 at the rear of the enclosure 18, the touch screen door 19 displays a promotional and/or decorative image or video as shown in FIG. 5A. After the food order has been supplied to the enclosure 18, the number of the enclosure 18 and the name of the customer for the order is displayed on the touch screen door 19 as shown in FIG. 5B; i.e., "#2 John H". However, as shown in FIGS. 3 and 8A, the "John H." order, because of its size has necessarily been delivered to two enclosures; i.e., "#2" and "#3" and peripheral portions 62 of the touch screen doors 19 on those enclosures are illuminated to assure that the customer "John H." understands that his order is contained in two adjacent enclosures 18. When a customer such as "John H." is ready to open enclosures "#2" and "#3", he taps on the touch screen door 18 as shown in FIG. 8A and new display appears on the touch screen 19 of enclosure "#2" as shown in FIG. 8B.

Figure 8B:
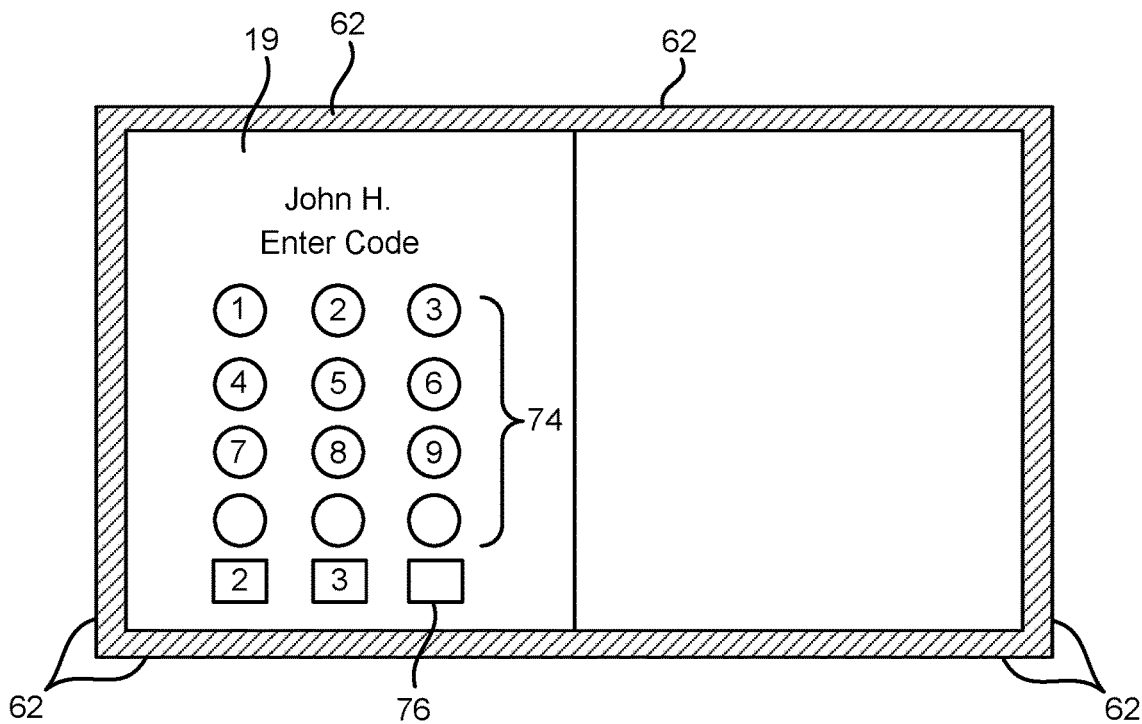
FIG. 8B is a view of the two adjacent screens of FIG. 8A after customer interaction with the screens shown in FIG. 8A.

In accordance with one important aspect of the invention, the touching of the touch screen in FIG. 8A enables the display shown in FIG. 8B which represents a key pad 74 for entering an assigned code and three windows 76 for displaying the code entered using the key pad 74. As shown, only the code numbers "2" and "3" have been entered and are displayed in the first and second window. The customer will have received the assigned code which may be displayed on the touch screen 30 of a kiosk 12 or printed at the kiosk 12. If the customer used his own personal device to make his/her order by using an application downloaded to his device or accessing the restaurant website, he may receive his assigned code by a text or e-mail delivered to that device or by other means enabled by using the restaurant APP or website.

Figure 8C:
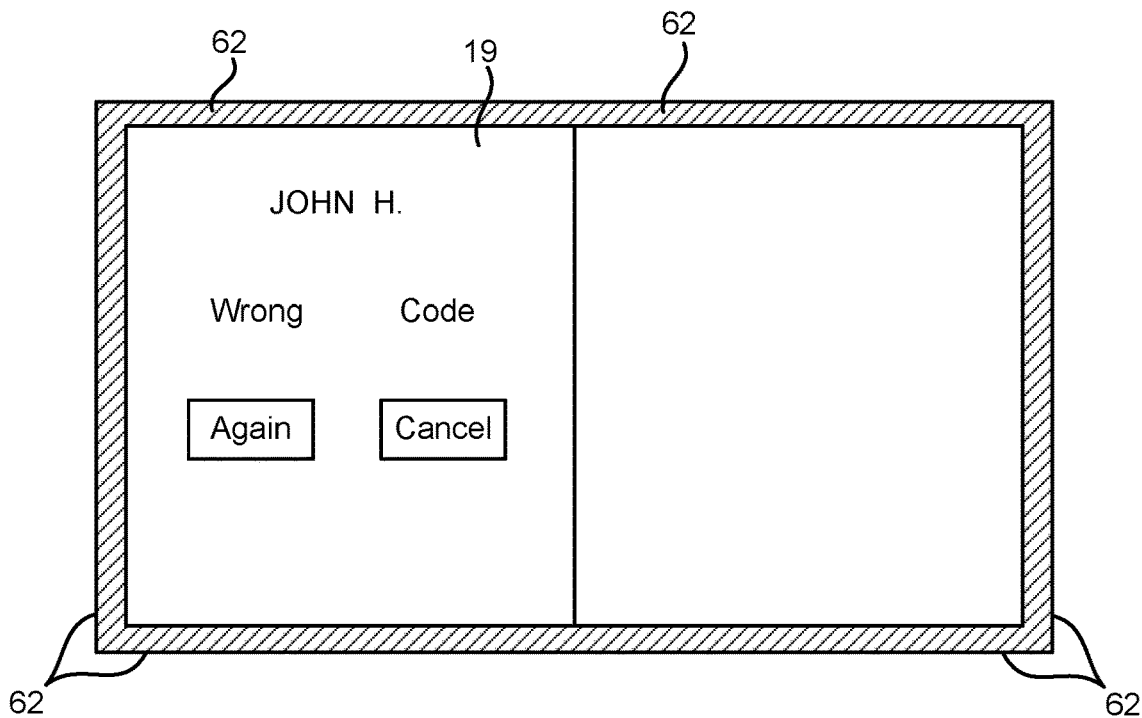
FIG. 8C is a view of the two adjacent screens of FIG. 8B after customer interaction with the screen shown in FIG. 8B.

In accordance with another important aspect, entry of the code using the key pad will produce another new display on the touch screen 19 as shown in FIG. 8C if the code which the customer entered was incorrect. By tapping on a button indicting that the customer can try "again", the display of key pad 74 as shown in FIG. 8B will be presented again. If the customer decides to abandon his efforts, he can tap on a "cancel" button.

Figure 8D:
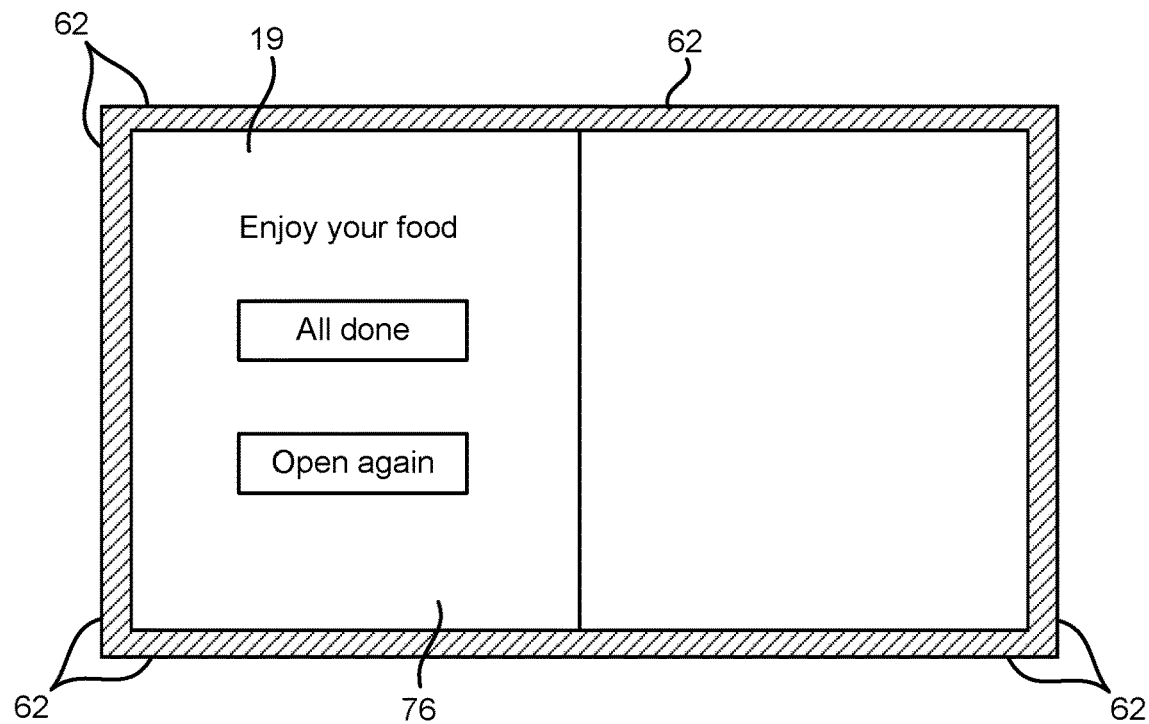
FIG. 8D is a view of the screen shown in FIGS. 8A and 8B after the customer has removed his/her order from the enclosure.

If the customer enters the correct code using the key pad 74, the touch screen door 19 will open. In accordance with another important aspect, the touch screen door 19 will remain open a predetermined period of time so as to allow the customer to remove his food order from the enclosure 18. After the predetermined period expires and the touch screen door 19 has closed as shown in FIG. 8D, the touch screen door will present a new display asking the customer whether he is "all done" which provides him with an opportunity to confirm by tapping on an "all done" button. If he is not done, he can so indicate by tapping on an "open again" button and the door 18 will again open for the predetermined period time. Preferably, the predetermined period of time is more than 15 and less than 60 seconds with approximately 30 seconds considered most preferred so as to provide sufficient time for the customer to remove the order but also return the enclosure to an available status as soon as possible to efficiently handle any order backlog created by other customers.

Figures 9, 10:
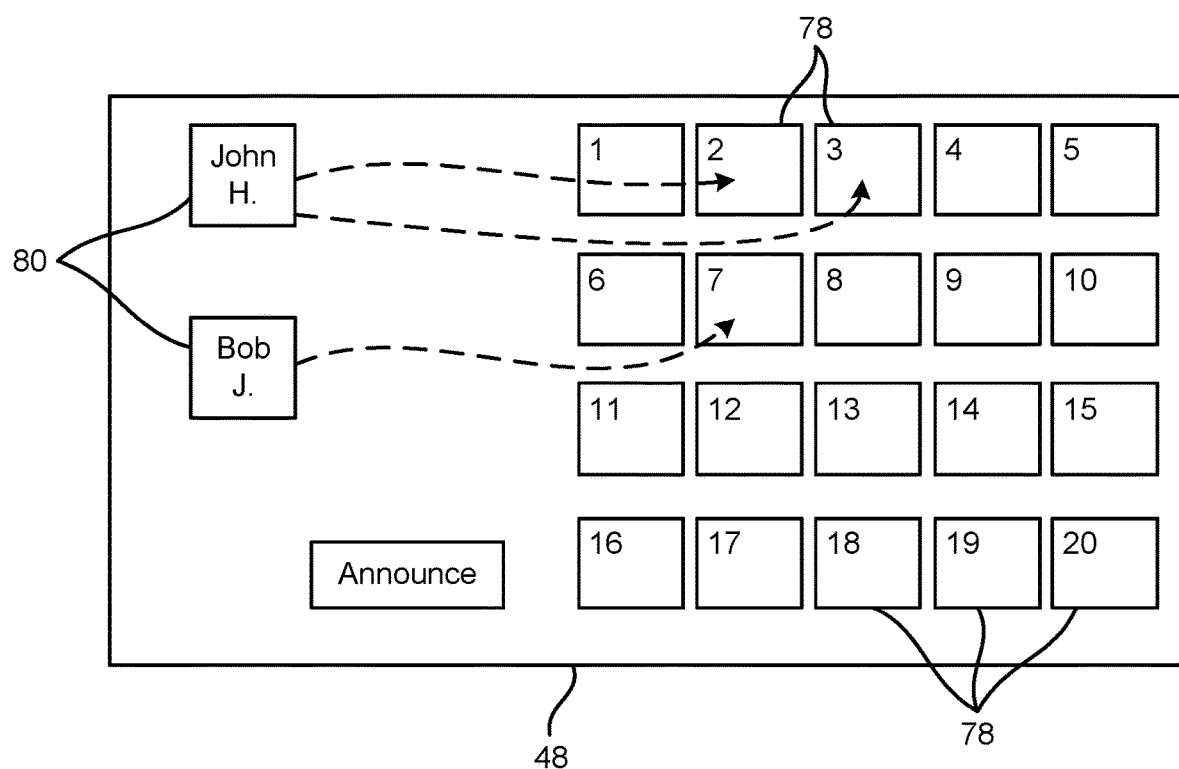
FIG. 9 is a view of a screen on an order preparation monitor in a food supply area behind the array of enclosures showing a queue of orders to be prepared.
FIG. 10 is a view of a screen on an order control monitor in the food supply area behind the array of enclosures to enable the assignment and delivery of different food orders to the enclosures in the array.

The display on the screen of the kitchen order preparation monitors 46 as shown in FIG. 9 includes customer names and the items in the order which need to be prepared. The orders are presented from top to bottom of the screen in the sequence that orders are to be prepared; i.e., those higher on the screen are prepared sooner. In accordance with another important aspect, the monitors 46 not only advise the kitchen personnel what to prepare in order to fulfill orders, the monitors 46 under the control of the billing and ordering computer 46 creates a queue of orders to be prepared based on the chronological receipt of orders from the kiosks 12, or for orders placed on personal devices, the specified pick-up time less a predetermined period of order preparation time. In other words, if a customer specifies a pick-up time of 1:30 PM on his or her personal devices, the order is placed in the queue as if it had been ordered at a kiosk 12 at 1:25 PM assuming that the predetermined period for the order preparation time is 5 minutes.

Figure 10A:
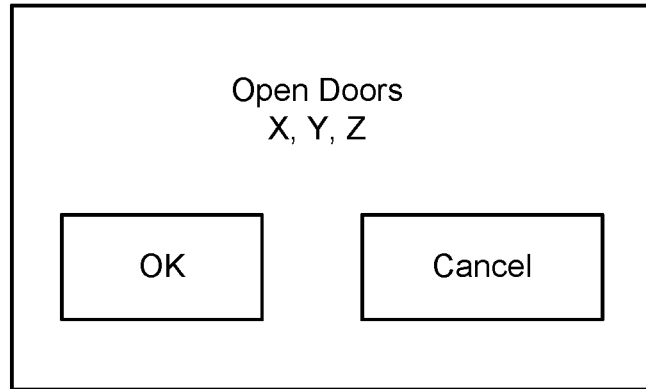
FIG. 10A is a view of a pop-up on the screen of FIG. 10 which confirms the delivery of an order to specific enclosures.

The display on the screen of the kitchen expediter monitor 48 includes representations 78 of each of the enclosures 18 in the array 16 as shown in FIGS. 1 and 3 and representations of orders 80; e.g., orders from "John H." and "Bob J". Order expediters in the kitchen area are able to drag the representation of an order 80 to a representation 78 of one or more enclosures. For example, the representation 80 of the order of "John H." can be dragged to representations 78 of enclosures #2 and #3. The expediter may then open the hinged door 66 on enclosures #2 and #3 and place the "John H." order in those enclosures. By tapping or clicking on the representation of enclosure #2 on the screen of the expediter monitor once, a pop-up display as shown FIG. 10A appears showing the enclosures involved in his order. The expediter can then confirm that the order has been delivered to the enclosures specified in the pop-up by tapping or clicking on the "OK" button or cancel by tapping on the "CANCEL" button. The expediter can then tap or click on the representation 78 twice to signify that the order is complete and then tap or click on the "ANNOUNCE" button and the customer's name and enclosure number will appear on the screen of the order ready monitor 26.

Figure 10B:
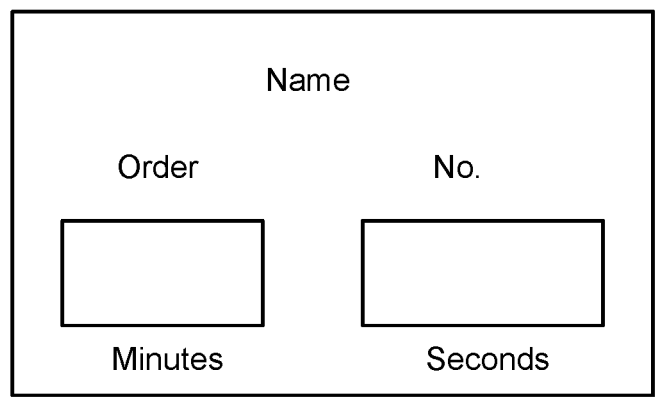
FIG. 10B is a view of another pop-up on the screen of FIG. 10 which confirms the status of an order in a particular enclosure.

In accordance with another important aspect, the expediter is alerted to the status of each of the enclosures through the use of color coding to signify the availability of each enclosure 18 in the array. For example, the representation 78 of the enclosure may be colored blue if the corresponding enclosure is available for a new delivery. The representation 78 may be colored green if an order has recently been placed in the corresponding enclosure. The representation 78 may be colored yellow if the touch screen door of the corresponding enclosure has been opened and closed after the timing out of the predetermined time for automatic closing (e.g., 30 seconds). The representation 78 may also be colored red if a prolonged period of time has passed since an order was placed in the corresponding enclosure. The expediter can also tap or click once on any representation and a pop-up display will appear as shown in FIG. 10B. The pop-up will not only identify the customer and order code but will also display how long the order has been in the corresponding enclosure expressed in minutes and seconds. If the expediter determines that an order should not be supplied to any enclosure or be removed from any enclosure because of the length of time that an order has been in the enclosure, he may physically remove the order from the enclosure and also drag the order out of the corresponding representation 78.

Figure 11:
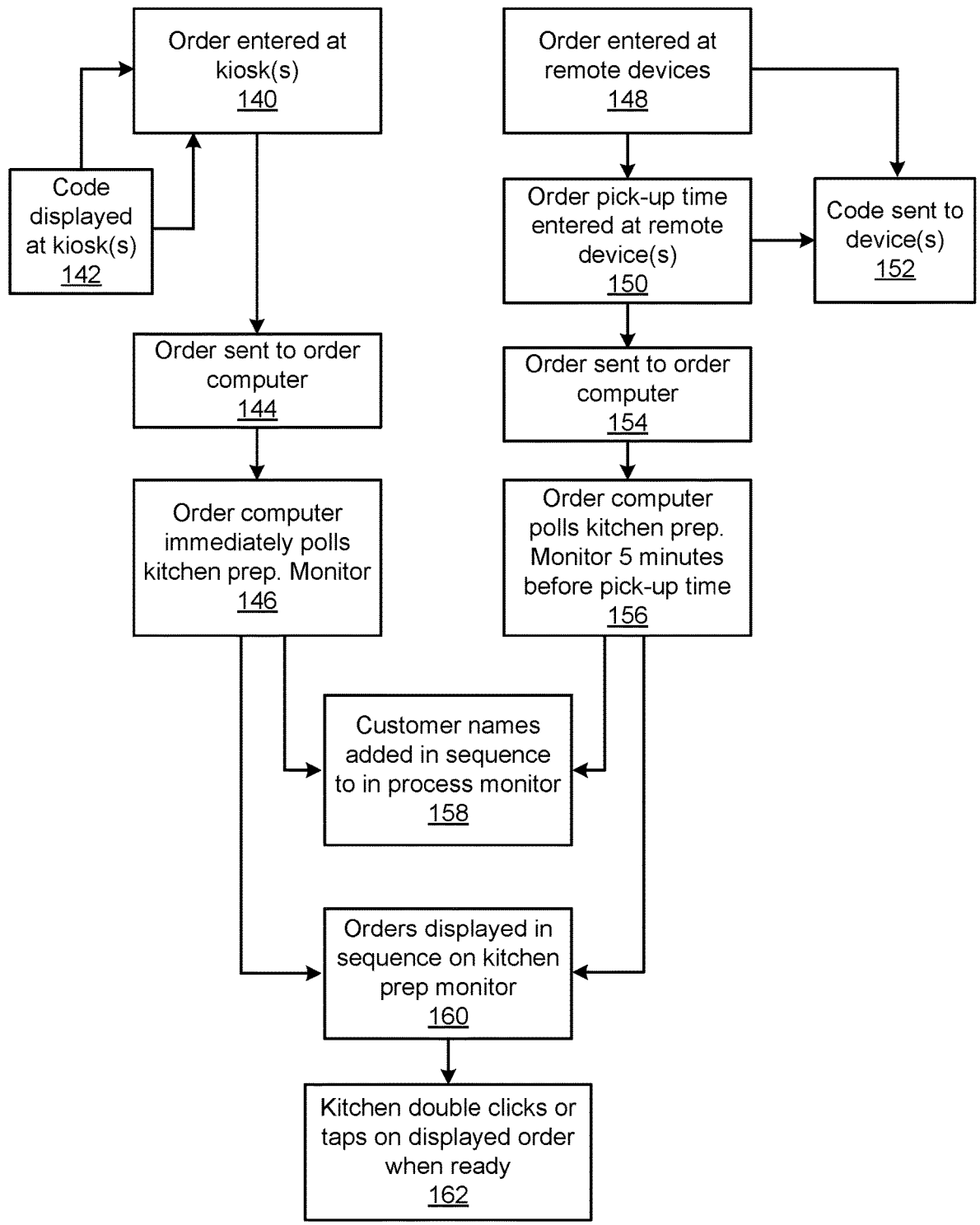
FIG. 11 is a diagram of an algorithm for generating, sequencing and preparing customer orders.

The specific steps of an algorithm used by the orders computer 45 for performing Steps 120 through 130 of the flow chart of FIG. 3A for the orders computer 45 are shown and described in FIG. 11. More specifically, Steps 140, 142, 144 and 146 (kiosk ordering), Steps 148, 150, 152, 154 and 156 (remote device ordering), and Steps 158, 160 and 162 (order preparation information) as described in FIG. 11 are all performed by and under the control of the orders computer 45.

Figure 12:
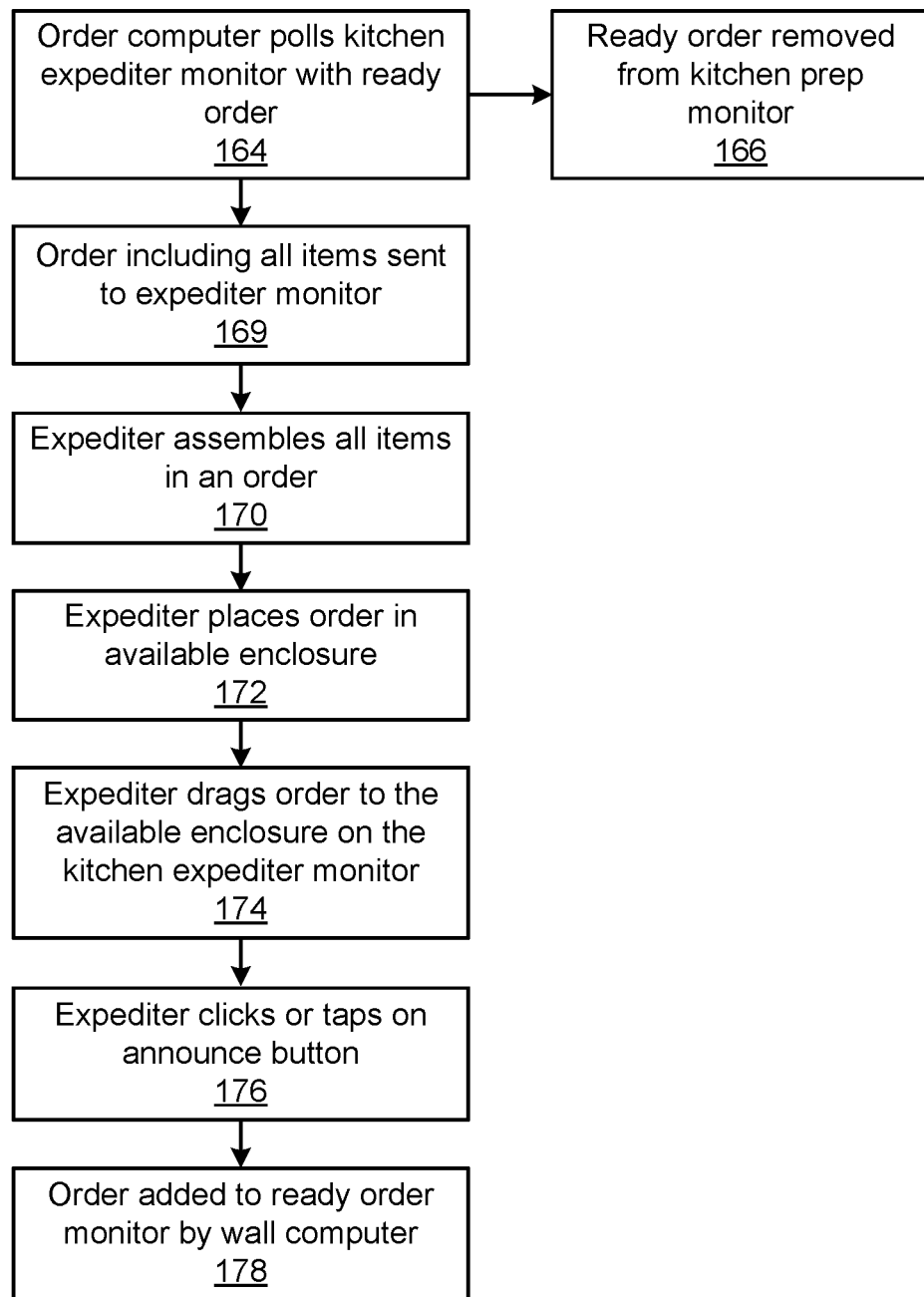
FIG. 12 is a diagram of an algorithm for assigning and supplying customer orders to various enclosures in the array.

The specific steps of an algorithm for performing Step 132 of the flow chart of FIG. 3A are shown and described in FIG. 12. More specifically, Steps 168, 170, 172, 174, 176 and 178, as described in FIG. 12, all relate to displays on and used of the expediter monitor 48 as enabled and controlled by the wall computer 44. Steps 164 and 166 are performed by and under the control of the orders computer 45.

Figure 13:
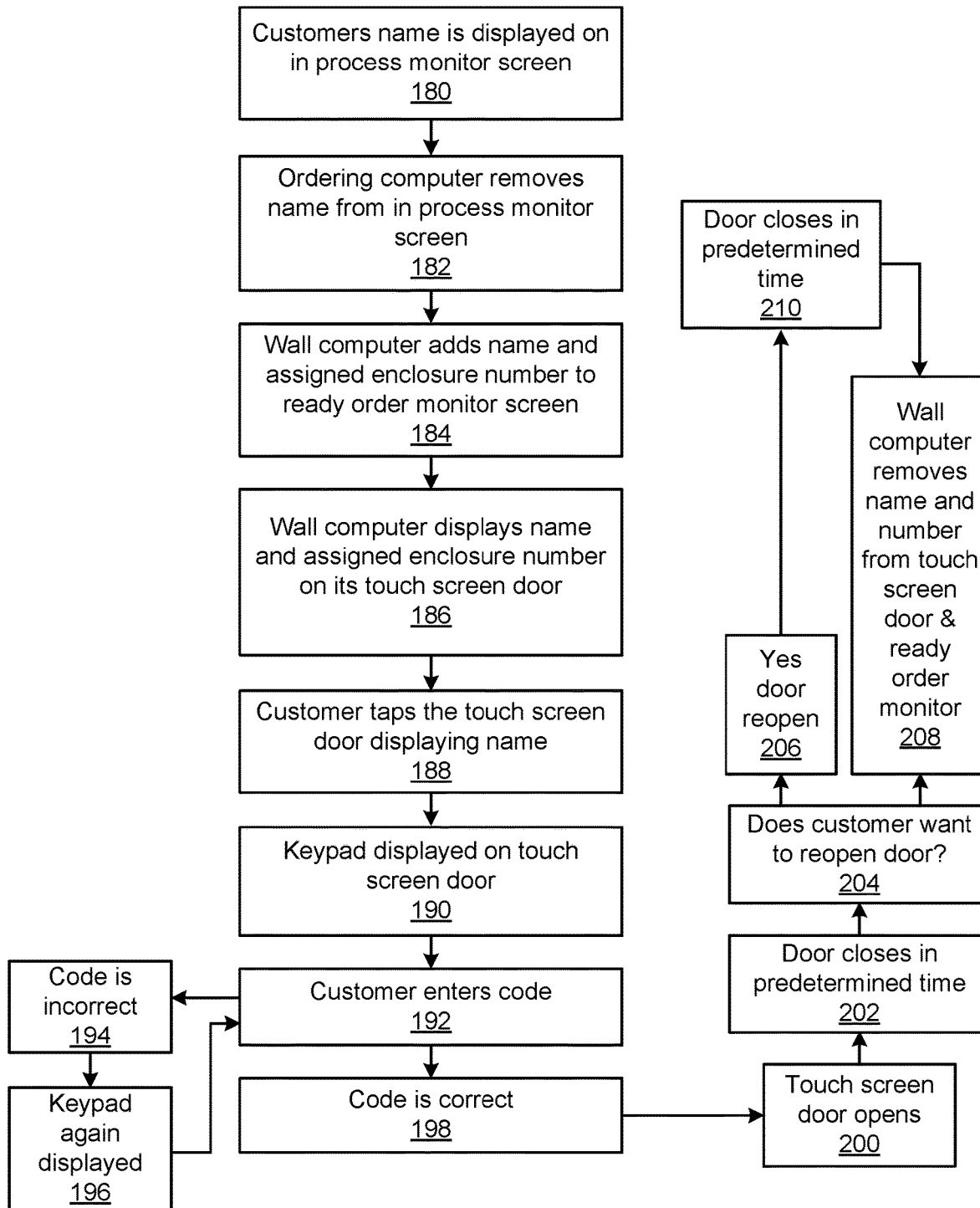
FIG. 13 is a diagram of an algorithm for delivering a food order from an enclosure in the array.

The specific steps of an algorithm used by the wall computer 44 for performing Steps 134 and 136 of the flow chart of FIG. 3A and providing the functionality described with respect to FIGS. 8(A-D), 9, 10, !0A and 10B are shown and described in FIG. 13. More specifically, Steps 180, 182, 184, 186, 188, 190, 192, 194, 196 and 198 all related to the displays and interaction of the customer with the displays on a touch screen 19 of a door 18 of a box 14 before the door 18 opens. Steps 200, 202, 204, 206, 208 and 210 all relate to the displays on the door screen 19 after the door 18 opens.

As described above, the customers touch the touch screen doors 19 to enter the customer specific codes to open the doors on the enclosures to access their orders. The customers may subsequently need to touch the doors 19 if they enter incorrect codes or need to open the doors again. This touching potentially exposes the customers to germs including extremely contagious viruses. Although the customers can use their personal devices to order their food and avoid the use and touching of the touch screens 30 on the kiosks 12, images on the touch screen doors 19 as shown in FIGS. 8(A-D) may be transmitted over the Internet from the Wall Computer 50 to the website server 58 and the server for the Device APPs 60 as shown in FIG. 3 so as to allow the customers to interact with the displays of FIGS. 8 (A-D) on their personal devices without ever touching the touch screen doors 19. Another embodiment of the invention in which personal devices may be used to order food and open the doors 19 on the enclosures in a touchless manner will now be described with reference to FIGS. 14 and 15A&B.

As described in FIG. 14, a customer orders using their personal device without using or touching any of the kiosks 12. In Step 1, the customer accesses the restaurant website using the browser of their personal device to obtain restaurant information including the menu. In the alternative, the customer can access the information available on the website by using an APP stored on their personal device. By touching an "Order Button", the customer is placed in communication with the order and billing computer 46 which may be on-site at the restaurant as shown in FIG. 3 or off-site and provided by a third-party point-of-sale (POS) service entity such as Toast using the WEB. With this communication, the customer is able to perform Step 2 including the review and selection of menu items which are displayed as one or more images on the screen of the personal device. This is followed by Step 3 wherein the customer pays for the order, specifies a pick-up time and identifies a contact e-mail address and telephone number. In Step 4, the POS entity then provides an order confirmation by e-mail. Using SMS, the restaurant provides the customer with advisories indicating that their order is "in progress" in Step 5 and that the order is "almost ready" in Step 6. In Step 7, the customer is provided with an SMS text providing a customer specific, pick-up code and a customer-specific URL to be used for a touchless pick-up. Although a customer order number provided by the POS system could be used as the pick-up code, the pick-up code is preferably randomly generated in this embodiment.

When the customer is ready to pick-up their order, they will be presented with a series of displays on the touch screen door 19 of the enclosure receiving their order as shown in FIG. 15A. Display 80 appears on the screen before the customer's order is placed in the enclosure 18 behind the touch screen. After the order for a particular customer (e.g., "Claire") has been placed in the enclosure number "16", the display 82 appears on the touch screen door 19 so as to advise and/or confirm that the order of the customer "Claire" has been placed in enclosure number "16". If the customer "Claire" does not choose to use a touchless opening of the enclosure, she can touch the display 82 and will then be presented with display 84 confirming her order number "259" and presenting a keypad which she can use to open the door of the enclosure by entering her pick-up code which is randomly generated and different from her order number. If the door will not open after the pick-up code is entered or any other problem or issue arises, "Claire" can touch the word "HELP" on the display 84 and the display 86 will appear. "Claire'" then is presented with various problems/ issues which she can tap in an effort to provide a solution to "Claire's" problems/issues.

Figure 15B:
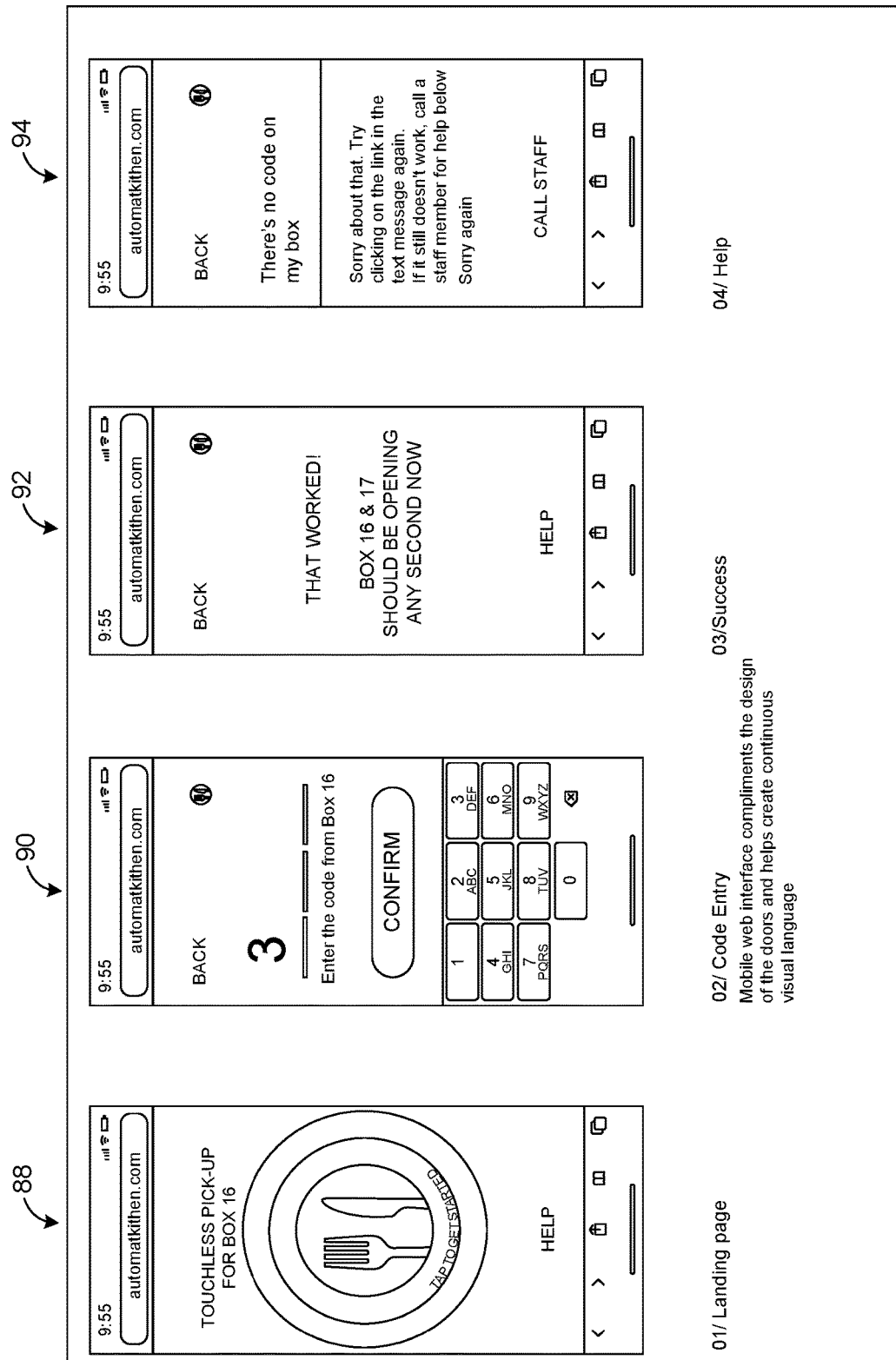
FIG. 15B is a view of four sequentially presented images presented on the customer's portable personal device for opening the enclosure behind the screen shown in FIG. 15A without touching the screen or any other enclosure surface.

If a customer such as "Claire" confirms that she wants to open the door of the enclosure 16 in a touchless manner using the customer-specific URL received by e-mail, the displays of FIG. 15B will serially appear on the personal device of the customer. A display 88 confirms that a touchless pickup for enclosure ("BOX") 16 is enabled. By touching or clicking on that screen showing a button defined by a circle containing a knife and fork, image 90 will appear showing a keypad and instructions to enter the randomly generated pick-up code which is displayed on the touch screen of the enclosure ("Box")16 and was received by SMS in step 7 of FIG. 14. If the customer correctly enters the pick-up code, image 92 will appear confirming on the door of the "BOX" 16 as well as the "BOX" 17 containing the customer's order. Image 94 appears if no pick-up code is displayed on the assigned enclosure ("BOX") with instructions to call a staff member. Note that help can also be summoned by touching or clicking on the word "HELP" in the displays 88, 90, and 92 and prior displays may also be accessed using the "BACK" buttons.

As an alternative to entering the pick-up code on a keypad appearing on the customer's personal device for touchless opening, touchless opening may be achieved by the customer by using the SMS in the following way. The customer first goes to the SMS text provided in Step 7 of FIG. 14 which contains the pick-up code. The customer then uses the text to open the door in one of three different ways: (1) the customer can click on the pick-up code in the received text; (2) the customer can send a reply text containing the pick-up code; or (3) the customer can send a reply text consisting of the word "open".

Another alternative for touchless opening involves the use of a QR code. A customer-specific QR code is contained in an SMS message received by the personal device of the customer. The wall 14 is capable of reading the QR code on the screen of the personal device and then transmitting a customer specific URL to that device which is unique to the customer. The customer can then open the door and perform other functions such as seeking help by interacting with the display on the screen(s) provided by the URL. This assures that the door will only open when the customer is physically present in the restaurant to scan in their QR code. In addition, the URL may be used to access the displays like those shown in FIG. 15 so as to allow the customer to enter a pick-up code delivered by SMS on a keypad so as to provide a double layer of security.

Although touchless ordering and door opening is available, the customer may still choose to order at a kiosk by touching the kiosk screen and opening the door on a food enclosure by touching the screen on the door. A series of ordering steps are shown in FIG. 16 which are performed using a touch screen at a kiosk. In Step 1, the customer is presented with a screen saver. When the customer touches the screen saver, an image is displayed which provides the customer, in Step 2, with the ability to create an order by reviewing a menu and selecting menu items. In Step 3, the customer is presented with one or more screen images permitting the customer to place an order, pay, provide a pick-up time, provide a contact phone, and then, at the customer's option, enable a print-out of a receipt which includes the pick-up code. In Step 4, the image presented at the kiosk includes the pick-up code which is also delivered to the customer's contact phone by SMS.

Figure 17:
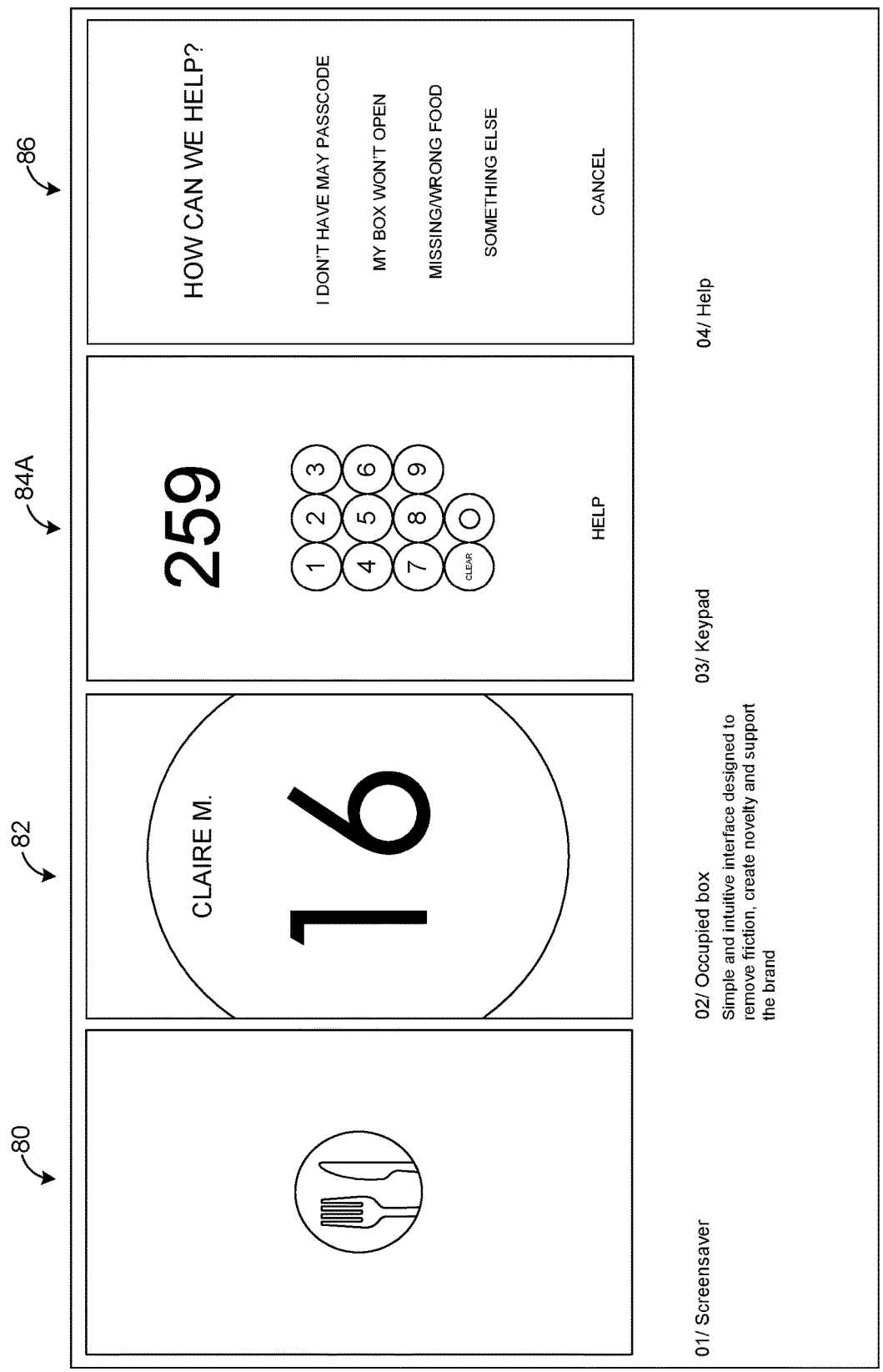
FIG. 17 is a view of four sequentially presented screens for opening an enclosure using the touch screen of the enclosure.

When the customer's order is ready for pick-up from an enclosure, the serial images on touch screen of the enclosure containing the order as shown in FIG. 17 are substantially identical to those on the touch screen of the enclosure shown in FIG. 15A. However, if a customer order number is used as the customer-specific code and not a randomly generated code, display 84A as shown in FIG. 17 will not, for security reasons, include the customer order.

As in the embodiment of the invention shown in FIGS. 8A-D, the doors of the enclosures (or "BOXES") 18 in the embodiment of the invention described using FIGS. 14-17 may be set to close automatically a predetermined period of time after opening. Since a customer may not be able to remove all of the items in one or more assigned enclosures during this holding period, customers need to be provided with an opportunity to reopen the enclosures. Accordingly, a display will appear on the touch screen of the enclosure door, as well as on the personal device of a customer operating in the touchless mode, which can used to reopen the door for another predetermined period time.

The screens of the order control or expediter monitor 48 in this embodiment of the invention will now be described in detail with reference to FIGS. 18A-F. As in the earlier described embodiment as shown in the displays shown in FIG. 9, the monitor 48 is under the control of the "Wall Computer" 44 which, in this embodiment, operates under stored program instructions so as to allow the expediter to interact with the screen by clicking or tapping on the screen to perform various functions and view various displays on the screens which may be color coded to indicate various conditions as will now be described.

Figure 18A:
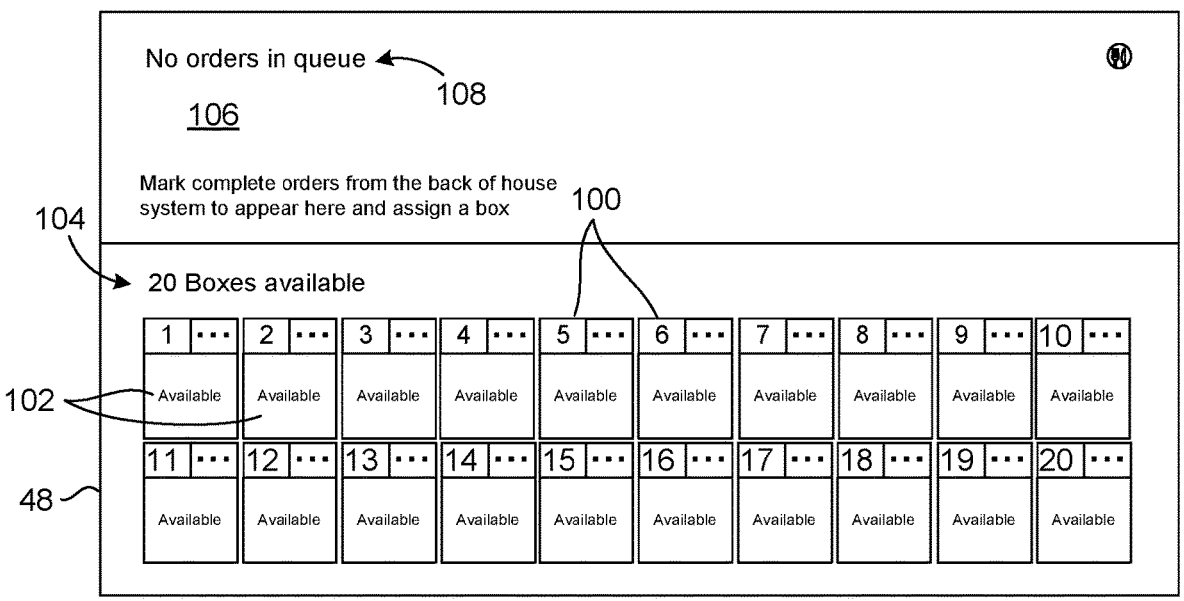
FIG. 18A illustrates an alternative configuration for the display on the screen of the order control monitor in the food supply area showing no orders in the order queue and all 20 of the enclosures available.

In FIG. 18A, all 20 enclosures in the wall 14 are depicted in the display by numbered squares 100 with enclosure status displays 102 immediately below the numbered squares. As shown, the status displayed for each of the displays 102 indicates that the respective enclosures or "BOXES" are available to receive an order (e.g., "Available") consistent with a status summary displayed in the area 104 indicating all "20 Boxes Available". An area 106 above the area 104 is available to display an order queue which is empty in FIG. 18A which is consistent with an order summary displayed in area 108 indicating "No orders in queue".

Figure 18B:
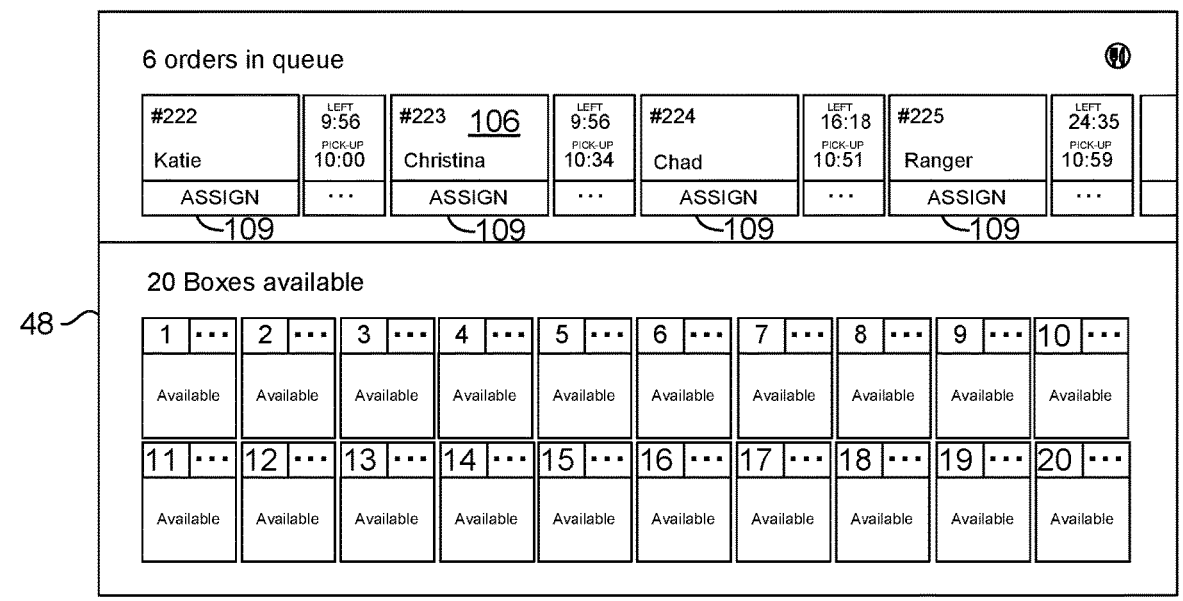
FIG. 18B illustrates a display on the screen of the order control monitor at a later point in time showing 6 orders in the order queue and all 20 enclosures still available.

The display on the screen as shown in FIG. 18B still shows all "20 Boxes Available" but an order queue is now displayed in the area 106. The order queue which is chronological by specified pick-up times provides four pieces of information: (1) a customer name (e.g., "Katie"); (2) a customer specific order number (e.g., "#222" for "Katie"); (3) a time that the order was left (e.g., "9:56" for "Katie"); and (4) a time of pick-up specified (e.g., "10:00" for "Katie"). An area immediately below each customer name displays an "ASSIGN" button 109 on which the expediter can click or tap to initiate an assignment of an order to an enclosure or "Box".

Figures 18C, 18D:
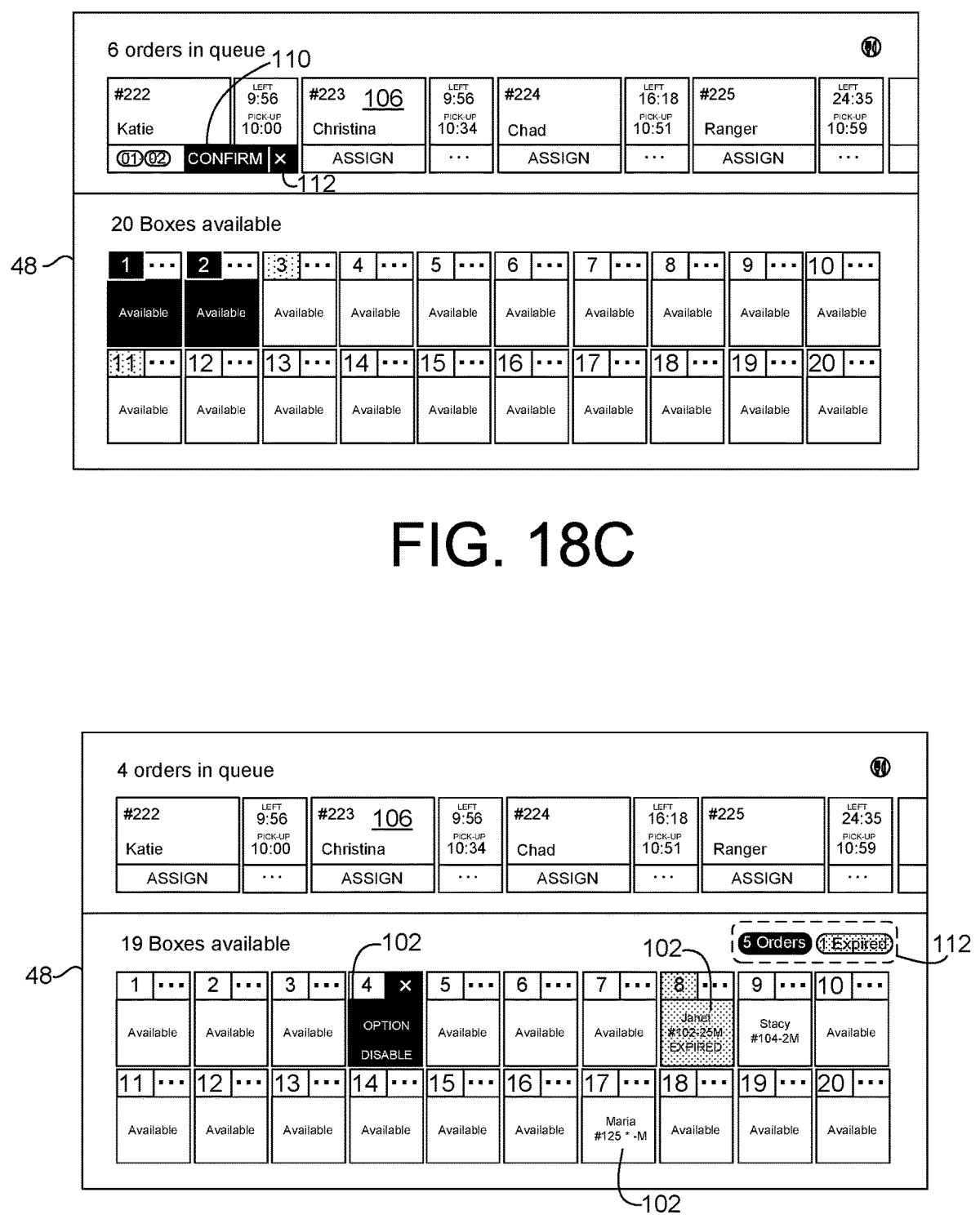

FIG. 18C illustrates the enclosure or "Box" assignment process using the order of "Katie" as an example. As shown, there are still 6 orders in the queue but the "ASSIGN" button 109 shown in FIG. 18B under "Katie" has been clicked or tapped on to initiate the assignment for the order of "Katie" to enclosures or "Boxes" 1 and 2. Because of the size of the "Katie" order, the expediter has determined that two enclosures or "Boxes" will be required and the expediter has therefore clicked or tapped on two adjacent boxes for the convenience of "Katie". Of course, a smaller order would only require the selection of one enclosure or "Box". After the expediter has loaded the "Katie" order into the enclosures or "Boxes" 1 and 2, the expediter can confirm that the order has been loaded into the enclosures by clicking or tapping on a "CONFIRM" button 110. This will remove the "Katie" order from the order queue in the display of FIGS. 18B&C and show the "Katie" order in enclosures or "Boxes" 1 and 2 in the display of FIG. 18E which shows only "Chad" remaining in the order queue and then only 18 boxes available with the "Katie" order shown in the area 102. In the alternative, the expediter can cancel the enclosure assignment by clicking or tapping on a cancel or "X" button 112 shown in FIG. 18C and the "Katie" order will return or remain in the order queue as shown in FIG. 18B.

FIGS. 18 D-F show the status of all enclosures or "Boxes" which are not designated as "available" so as to provide the expediter with important information in the area 102. For example, the areas 102 for enclosures or "Boxes" 1 and 2 shown in FIG. 18E display information which indicates the order number (i.e., #222) for the "Katie" order has been in the enclosures for 5 minutes after the specified pick-up time. In FIG. 18D, the area 102 for enclosures or "Boxes" 8 and 17 display, by way of example, information for the "Maria" order #125 and the Janet order #102. The minus sign indicates that the specified pick-up time for the "Maria" order will not occur for another minute (i.e., the order was necessarily placed in the enclosure prior to the specified pick-up time). In the case of the "Janet" order, 25 minutes have elapsed beyond the specified pick-up time which exceeds a predetermined limit and that fact is denoted by displaying the word "Expired". In order to be sure that the expediter is aware of this expiration and can then remove the order from the enclosure, the words and numbers may be color coded red. Red color coding may also be used to indicate the number of minutes that have elapsed since the specified pick-up time even though the predetermined limit has not been reached as in the case of the "Katie" order. Green color coding may be used for the number of minutes prior to the specified pick-up time as in the case of the "Maria" order.

Additional displays shown in FIGS. 18 D and F may be used to indicate other types of enclosure or order issues. For example, the expediter may disable an enclosure as in the case of enclosure #4 as shown in FIG. 18D by tapping or clicking on the "X" in the display. As shown in FIG. 18F, the area 102 for enclosures #1 and #4 display information indicating that the orders in these enclosures liave been picked-up or collected. The information displayed in the area 102 for enclosure #1 indicates "Masha" order"#101" was "Collected". The displays on the expediter monitor can also show other conditions encountered with orders which require follow-up. The displayed information shows two such conditions for the enclosures #15 and #9 shown in FIG. 18F. The enclosure #15 display tells the expediter that "Patrick" has asked for help, a staff member will need to render assistance, and the expediter can clear the display by tapping on the menu button represented by the asterisks. The enclosure #9 display tells the expediter that there has been a food error in the "Mike" order delivered to the enclosure, that he should recall the order and food delivered to the enclosure and use the menu button represented by the three asterisks to reset the display.

Each representation of the enclosures or "Boxes" #1 through #20 in the displays shown in FIGS. 18A-F includes a menu button represented by three dots located adjacent the enclosure number. The expediter may tap or click on these menu buttons which will allow the expediter to perform various functions such as disabling a box or opening the door for a customer.

Figures 18E, 18F:
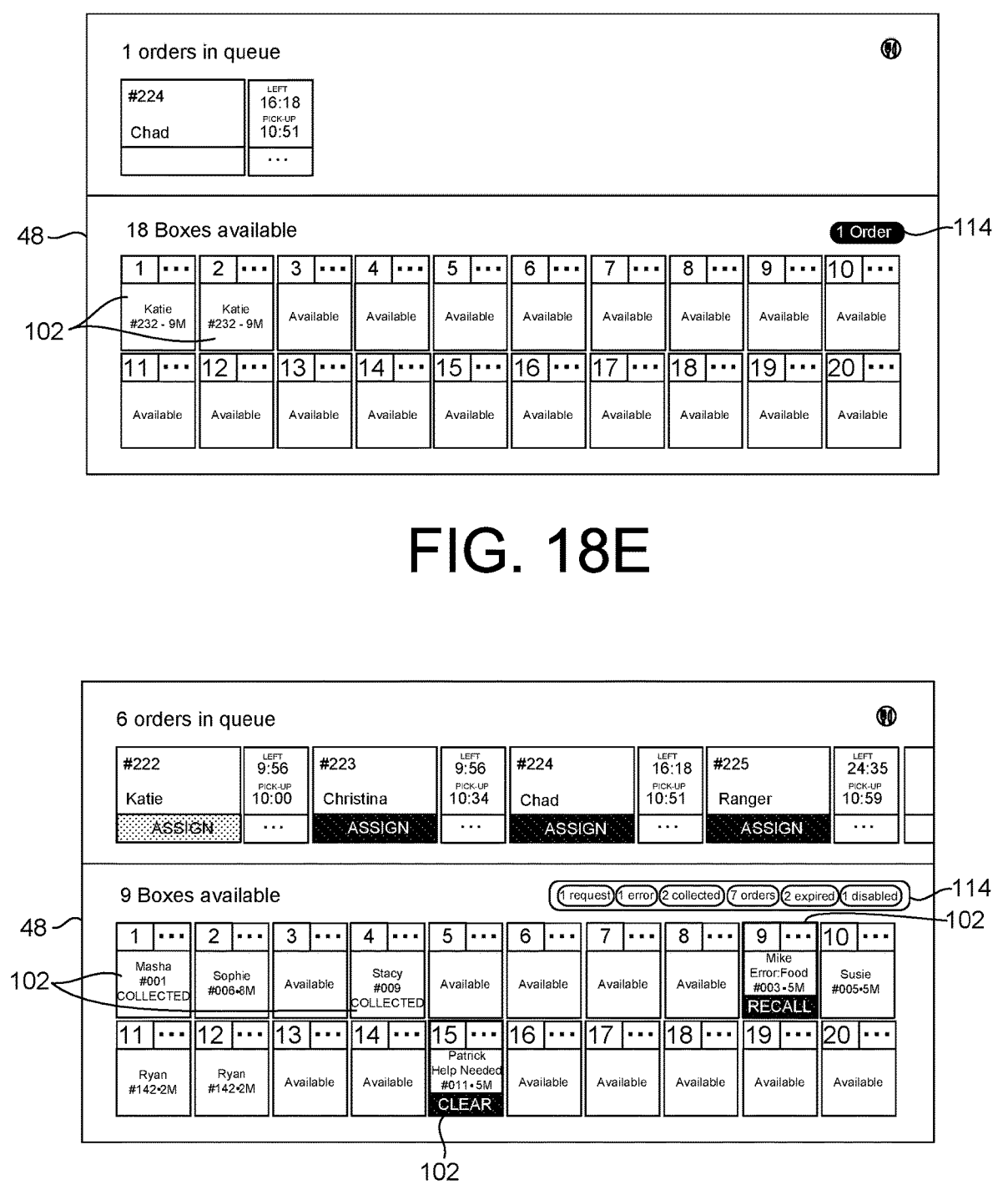

A summary of activity in the various enclosures or "Boxes" 100 may be provided on the screen of the expediter monitor 42. That summary may be displayed in areas 114 as shown in shown in FIGS. 18 D-F. With respect to the activity as shown in FIG. 18E, the following summary is displayed: "1 order". With respect to activity as shown in FIG. 18D, the following summary is displayed: "5 orders" and"1 expired". Although not included in the area 114 shown in FIG. 18D, the display could include "1 disabled". With respect to the activity as shown in FIG. 18F, the following summary is displayed in the area 114: "1 request", "1 error", "2 collected", "7 orders", "2 expired", "1 disabled".

In order to handle issues arising with customers as they try to collect their food from the enclosures, the displays on the expediter screen as shown in FIGS. 18A-F may be made available to a customer service person. This may be accomplished by providing an APP which may be downloaded to a tablet or other device available for use by the customer service person, where the APP provides the same displays and functionality to the tablet or other device being used80y the customer service person.

The display on the monitor 28 as shown in FIG. 19 displays information to customers concerning "ACTIVE ORDERS" or "ORDERS IN PROCESS". Unlike the display in FIG. 7, the display to customers as shown in FIG. 19 describes the status of some orders as only "RECEIVED" and the status of other orders as "COOKING" so as to provide the customer with more information about the progress of their order.

Figure 22:
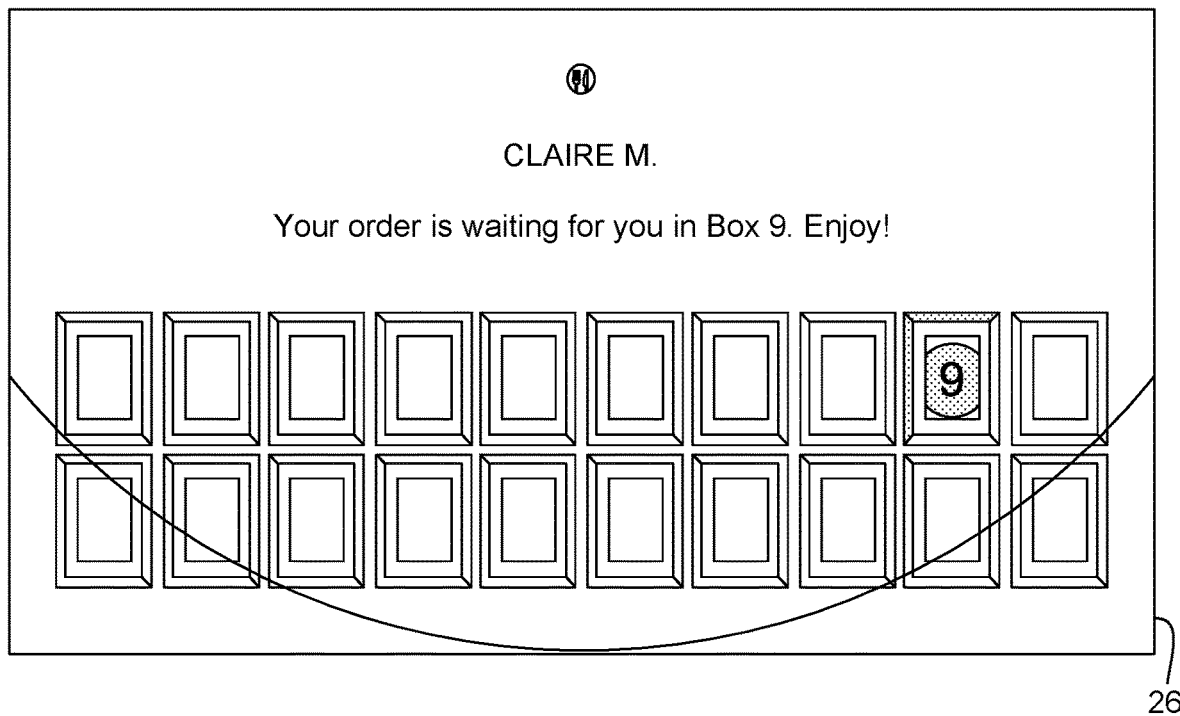
FIG. 22 illustrates a display on the monitor advising customers of orders prepared and placed in the enclosures which also alerts a single customer for a brief period of time that their order has just been placed in an enclosure.

FIGS. 20-22 show three different, dynamic displays which may appear on the monitor 26 to advise customers that their orders are ready to be collected from one or more assigned enclosures or "BOXES" 18. In FIG. 20, there are only three "READY TO COLLECT" orders so the space dedicated to each order on the screen of the monitor is large thereby maximizing the size of each customer's name and the number of the enclosure. As shown in FIG. 21, the display must accommodate twenty customer orders which are ready to collect so the space available for and the size of the customer's name and assigned enclosure are necessarily limited. However, in order to assist a customer with recognizing that their order is ready to collect, the display shown in FIG. 22 appears on the monitor 26 for a few seconds as soon as the order is ready (i.e., "CLAIRE" in enclosure 9) and then reverts to the display shown in FIG. 21 with the customer's name being added to the list in FIG. 21.

Figure 23:
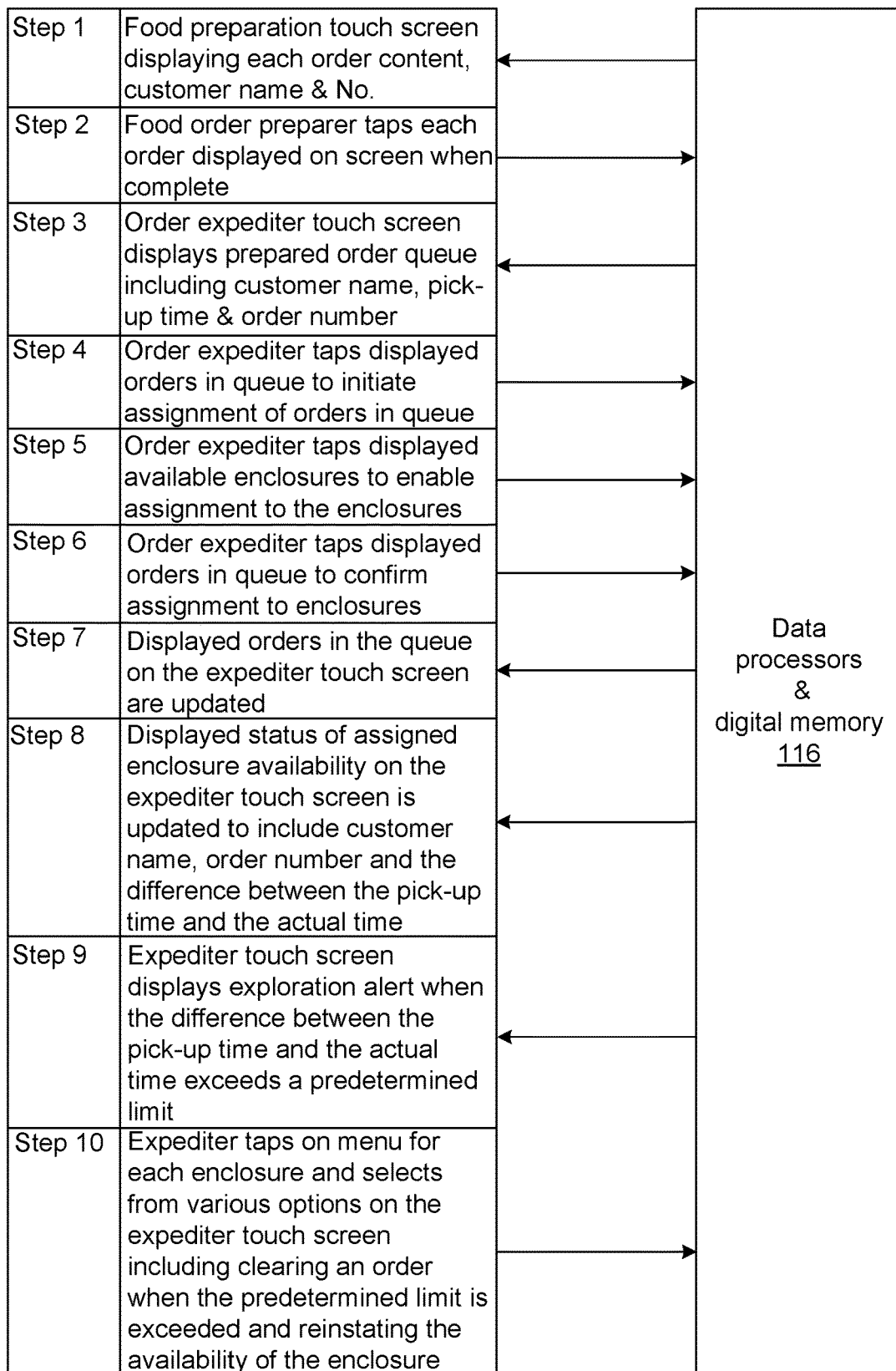
FIG. 23 is a flow diagram illustrating the steps in an algorithm for generating the various displays on the order control monitor as shown in FIGS. 18A-F.

FIG. 23 illustrates a series of steps 1-9 representing the interaction between touch screens of the kitchen order preparation monitor 46 and control order control monitor 48 (i.e., the "expediter monitor") shown in FIGS. 9, 10 and 18(A-F) which are under the control of the order computer 45 and the wall computer 44 shown in FIG. 3. As shown in FIG. 23, these computers 45 and 44 as well as the digital memory storing the necessary programmable instructions are depicted by block 116. Steps 1 and 2 as shown are directed to the use of interactive displays on the touch screen of the kitchen order preparation monitor 46 by the kitchen order preparer to make the orders presented and then signaling when each order has been prepared and ready for the expediter to deliver each order. Steps 3-10 as shown are directed to the interactive displays of FIGS. 18A-F which are read, used and/or created by the expediter.

While the invention is susceptible to various modifications and alternative constructions, only certain illustrative embodiments have been shown and described in the drawings and accompanying detailed description. It should be understood, however, that there is no intention to limit the invention to the specific construction and embodiments disclosed herein. On the contrary, the invention is intended to cover all modifications, alternative constructions, embodiments, and equivalents falling within the scope of the invention as claimed herein.

What is claimed is:

1. A method for automated dispensing of food to customers comprising:
    providing an array of food delivery enclosures for delivering food from a food supply area, each of the enclosures including a food delivery opening accessible by a customer and an automated, movable door for opening and closing the food delivery opening;
    providing a computer system comprising at least one digital processor and a digital memory associated with the digital processor, the digital memory storing programmed instructions for the digital processor, the computer system including a customer ordering and billing subsystem receiving and billing different food orders from different customers using personal devices;
    receiving a plurality of different food orders from a plurality of different customers using a plurality of different personal devices;
    transmitting an SMS text to the different personal devices of the different customers confirming the different food orders and providing identical instructions enabling opening of the movable door on different enclosures receiving the food orders of the different customers; and
    receiving an identical SMS reply with identical content to the SMS text from each of the different personal devices executing the identical instructions to enable the opening of the movable door of the different enclosures receiving the food orders of the different customers so as enable any one of the different customers to open the movable door of an enclosure receiving the food order of the one customer.

2. The method of claim 1 including the step of closing the movable door after a predetermined period of time and reopening the movable door of the different enclosures in response to another identical SMS reply from the customer personal devices of the different customers.

3. The method of claim 1 wherein a name of the customer and a particular number associated with a particular enclosure receiving the customer food orders is transmitted by SMS text to the customer personal devices of each of the different customers for display on the customer personal devices when the order is delivered to the particular enclosure.

4. The method of claim 1 including the step of providing a visual indication at each of the different enclosures when the food orders of the different customers are delivered to the different enclosures.

5. The method of claim 1 wherein each of the food enclosures includes a food supply opening accessible from the food supply area.

6. A method for automated dispensing of food to customers comprising:
    providing an array of food delivery enclosures for delivering food from a food supply area to customers, each of the enclosures having a food delivery opening accessible by a customer and an automated, movable door closing the food delivery opening;
    providing a computer system comprising at least one digital processor and a digital memory associated with the digital processor, the digital memory storing programmed instructions for the digital processor, the computer system including a customer ordering and billing subsystem receiving and billing different food orders from different customers using personal devices;
    providing a food order delivery monitor generating a display individually identifying each of the enclosures in the array and status of each of the enclosures including availability so as to allow a food order of a customer to be delivered to the enclosure and unavailability because the enclosure already contains a previously delivered food order of a customer;
    receiving a food order from a customer using a customer personal device;
    delivering the food order from the customer to an enclosure have a status of availability as displayed on the food delivery monitor;
    transmitting a door opening instruction to the customer personal device enabling opening of the movable door on the enclosure which has received the delivered food order of the customer; and
    receiving an SMS reply containing the door opening instructions entered by the customer on the customer personal device to enable the opening of the movable door of the enclosure which has received the delivered food order of the customer.

7. The method of claim 6 wherein a name of the customer and a particular number associated with a particular enclosure which has received the food order is displayed on the food order delivery monitor and is transmitted to the customer personal device for display on the customer personal device.

8. The method of claim 6 wherein the door opening instruction is transmitted in an SMS text and is displayed as an item on the customer personal device which the customer includes in the SMS reply to automatically open the movable door.

9. The method of claim 6 wherein the door opening instruction is transmitted in an SMS text and is displayed as an item on the customer personal device which the customer may click on to generate the SMS reply containing the door opening instruction to automatically open the movable door.

10. The method of claim 6 including the step of providing a visual indication at the enclosure receiving the food order of the customer when the food order is delivered to food the enclosure.

11. The method of claim 6 wherein each of the food enclosures includes a food supply opening accessible from the food supply area.

12. The method of claim 6 wherein a name of the customer and a particular number associated with a particular enclosure receiving the customer food order is displayed on the food delivery monitor and is transmitted to the customer personal device for display on the customer personal device when the food order is delivered to the particular enclosure.

13. The method of claim 6 wherein a customer specific URL is transmitted to the customer personal device so as to enable the customer the customer to use the URL when entering the door opening instruction.

14. The method of claim 6 wherein the door is automatically closed a predetermined time after opening.

15. The method of claim 6 wherein the door opening instructions comprises a code.

16. The method of claim 15 wherein the code is transmitted and received via SMS.

17. The method of claim 15 wherein the customer personal device is enabled to display a keyboard for use in entering the code.

18. The method of claim 15 wherein a message is transmitted to the customer for display on the customer personal device indicating that an incorrect code has been entered so as to enable the customer to enter the correct code.

19. The method of claim 15 wherein the code is transmitted and received over the Internet.

20. The method of claim 6 wherein the door opening instructions are received from the customer via SMS.

21. The method of claim 20 wherein the door opening instructions are transmitted to the customer personal device via SMS.

\* \* \* \* \*